(12) United States Patent
Kato

(10) Patent No.: US 9,540,855 B2
(45) Date of Patent: Jan. 10, 2017

(54) BIAXIAL HINGE AND ELECTRONIC DEVICE USING THE SAME

(71) Applicant: KEM HONGKONG LIMITED, Tsimshatsui, Kowloon (HK)

(72) Inventor: Hideo Kato, Kanagawa (JP)

(73) Assignee: Kem HongKong Limited, Tsimshatsui Kowloon (HK)

( * ) Notice: Subject to any disclaimer, the term of this patent is extended or adjusted under 35 U.S.C. 154(b) by 0 days.

(21) Appl. No.: 14/989,601

(22) Filed: Jan. 6, 2016

(65) Prior Publication Data

US 2016/0201367 A1    Jul. 14, 2016

(30) Foreign Application Priority Data

Jan. 14, 2015  (JP) ................................ 2015-005431

(51) Int. Cl.
 *G06F 1/16* (2006.01)
 *E05D 3/12* (2006.01)
 *E05D 11/08* (2006.01)

(52) U.S. Cl.
 CPC .............. *E05D 3/122* (2013.01); *E05D 3/12* (2013.01); *E05D 11/082* (2013.01); *G06F 1/1618* (2013.01); *G06F 1/1681* (2013.01); *E05D 2011/085* (2013.01)

(58) Field of Classification Search
 CPC .............................. G06F 1/1618; G06F 1/1681
 See application file for complete search history.

(56) References Cited

U.S. PATENT DOCUMENTS

| 6,253,419 | B1* | 7/2001 | Lu | G06F 1/1618 16/340 |
| 8,296,905 | B2* | 10/2012 | Zhang | G06F 1/1681 16/330 |
| 8,474,101 | B2* | 7/2013 | Wang | G06F 1/1681 16/354 |
| 8,776,319 | B1* | 7/2014 | Chang | G06F 1/1681 16/303 |
| 9,201,464 | B2* | 12/2015 | Uchiyama | G06F 1/1681 |
| 2011/0265288 | A1* | 11/2011 | Chiang | G06F 1/1681 16/341 |
| 2013/0016492 | A1* | 1/2013 | Wang | E05D 3/18 361/820 |
| 2013/0135809 | A1* | 5/2013 | Uchiyama | G06F 1/1681 361/679.09 |

(Continued)

FOREIGN PATENT DOCUMENTS

| JP | 2009063039 A | 3/2009 |
| JP | 2015148296 A | 8/2015 |

(Continued)

*Primary Examiner* — Anthony Q Edwards
(74) *Attorney, Agent, or Firm* — Notaro, Michalos & Zaccaria P.C.

(57) ABSTRACT

A biaxial hinge which allows a first casing having a keyboard and a second casing having a display to open and close 360 degrees relative to each other. The biaxial hinge ensures that the keyboard, rubber feet, and other parts can sink relative to the first casing. The biaxial hinge includes a biaxial hinge portion and an actuating mechanism. The biaxial hinge portion includes a rotation controlling unit. The actuating mechanism includes a fixed cam part, a slide cam part facing the fixed cam part, and a link part.

16 Claims, 22 Drawing Sheets

(56) References Cited

U.S. PATENT DOCUMENTS

2013/0194741 A1* 8/2013 Uchiyama ............. G06F 1/1681
361/679.26
2013/0318746 A1* 12/2013 Kuramochi ........... G06F 1/1681
16/342

FOREIGN PATENT DOCUMENTS

| JP | 2015155708 A | 8/2015 |
| JP | 2015175389 A | 10/2015 |
| JP | 2015203424 A | 11/2015 |

* cited by examiner

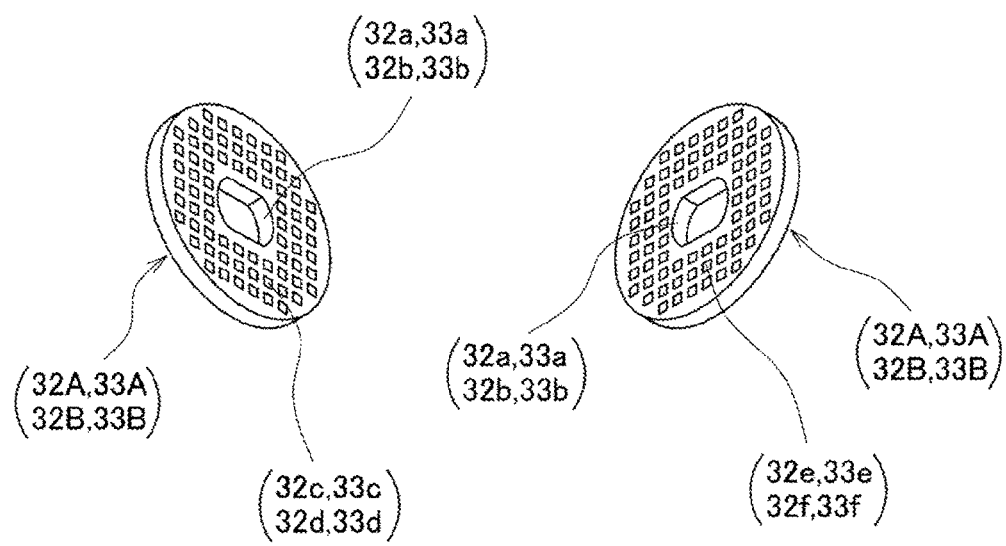

BIAXIAL HINGE AND ELECTRONIC DEVICE USING THE SAME

FIELD AND BACKGROUND OF THE INVENTION

The invention relates to a biaxial hinge of an electronic device such as a notebook PC, which couples a first casing with a keyboard portion and a second casing with a display portion such that these casings can open and close 360 degrees relative to each other; and the biaxial hinge is particularly suitably used in a tablet notebook PC, wherein its display portion has a touch operation function as well. The invention also relates to an electronic device using such a biaxial hinge, as a tablet notebook PC.

A PC, in which a first casing with a keyboard portion and a second casing with a display portion enabling touch operation function using hand can open and close 360 degrees relative to each other using a biaxial hinge, is called tablet notebook PC in general. The biaxial hinge for the tablet notebook PC of this type, in which the first casing and the second casing as described above can open and close 360 degrees relative to each other, is made known by JP Laid-Open Patent Application No. 2009-063039. However, in such tablet notebook PC, a user may use it as an ordinary notebook PC by inputting using the keyboard portion provided on the first casing, when the second casing is opened relative to the first casing, but it can be also put on a table such as desk, the first casing and the second casing having rotated 360 degrees relative to each other to a folded state, and input is made on the display portion by means of touching operation using his hand. Sometimes, the first casing and the second casing are folded relative to each other into the shape substantially of the letter L, so that the tablet PC is operated by touching operation with an underlying keyboard portion. In these cases, when an electronic device is used in a folded state and the keyboard portion provided on the first casing still protrudes from the upper surface of the first casing, a contact of the keyboard portion with a surface of the table results in erroneous operations, which is problematic. Or otherwise, when rubber feet are provided on the lower surface of the first casing, these rubber feet touch the backside of the second casing, so that the two casings cannot be folded to a horizontal position, which is again problematic. However, conventional biaxial hinges cannot solve the above-mentioned problems.

Therefore, the present applicant proposed in his previous patent application (JP Patent Application No. 2014-210298) a biaxial hinge of an electronic device, such as tablet notebook PC, which couples a first casing and a second casing, such that these casings can open and close 360 degrees relative to each other, wherein the biaxial hinge comprises a biaxial hinge portion provided with a means for controlling rotation, which ensures that a first shaft attached to the first casing via a first attaching plate and a second hinge shaft attached to the second casing via a second attaching plate are rotatable in parallel to each other via a plurality of joint members, as well as controls the rotation of the both hinge shafts. The biaxial hinge further comprises an actuating mechanism actuating an operation means working on a keyboard, rubber feet and others provided on the first casing. However, a complex structure of the above-mentioned actuating mechanism results in increased costs, so that a further cost reduction is required.

SUMMARY OF THE INVENTION

Therefore, an object of the present invention is to solve the above-mentioned problems by providing a biaxial hinge of a simplified structure which ensures that a first casing with a keyboard portion and a second casing with a display portion can open and close 360 degrees relative to each other, as well as enables a keyboard portion, rubber feet and so on to sink relative to the upper surface of the first casing, starting from a predetermined opening and closing angle.

Moreover, the invention is also applicable to any electronic device to be potentially developed, in which not only the first casing and the second casing are coupled via a biaxial hinge in an openable and closable manner, but also operation(s) of the biaxial hinge causes other operation means provided on the first casing and/or the second casing to function.

To achieve the above-mentioned object, the biaxial hinge according to the invention couples the first casing and the second casing of the electronic device such as tablet notebook PC, such that these casings can open and close 360 degrees relative to each other; here the biaxial hinge is characterized in that it comprises a biaxial hinge portion provided with a means for controlling the rotation which ensures that a first hinge shaft attached to the first casing via a first attaching plate and a second hinge shaft attached to the second casing via a second attaching plate, such that both hinge shafts are rotatable in parallel via a plurality of joint members, as well as controls the rotation of the first hinge shaft and the second hinge shaft; and an actuating mechanism for actuating an operation means working on a keyboard, rubber feet and others provided on the first casing and the second casing; that the actuating mechanism comprises: a fixed cam member rotating together with the first hinge shaft; a slide cam member attached facing the fixed cam member so as to be slide in one direction in an axial direction of the first hinge shaft; an elastic member provided between the slide cam member and the fixed cam member urged so as to be slide in one direction in an axial direction of the first hinge shaft; and a link member for converting the slide movement of the slide cam member in an axial direction of the first hinge shaft into the movement perpendicular to the axial direction and transferring the thus converted movement to the operation means.

Here, the invention is characterized in that the means for controlling the rotation comprises: a means for synchronizing the rotation which causes one hinge shaft and other hinge shaft to synchronously rotate in different directions; a means for generating friction torque respectively provided on the first hinge shaft and the second hinge shaft; and a means for sucking respectively provided on the first hinge shaft and the second hinge shaft.

Still further, the invention is characterized in that the means for controlling the rotation comprises: a means for selectively restricting the rotation which restricts the rotation of one hinge shaft during the rotation of other hinge shaft, such that both hinge shafts rotate one after the other; a means for generating friction torque respectively provided on the first hinge shaft and the second hinge shaft; means for sucking respectively provided on the first hinge shaft and the second hinge shaft.

Still further, the invention is characterized in that the operation means is a means for sinking, which comprises a cam mechanism for moving upwards and downwards a keyboard portion holding plate, wherein a keyboard portion is provided on an upper part of the keyboard portion holding plate.

Still further, the invention is characterized in that the actuating mechanism comprises: a fixed cam member having a fixed cam portion rotating together with the first hinge shaft; a slide cam member comprising a slide cam portion on the side facing the fixed cam member so as to be slidable in one direction in an axial direction of the first hinge shaft; and an elastic member provided between the slide cam member and the fixed cam member for urging the slide cam member to slide in one direction; and a link member for converting the slide movement of the slide cam member in an axial direction of the first hinge shaft into the movement perpendicular to the axial direction and transferring the thus converted movement to the operation means.

Still further, the invention is characterized in that the means for synchronizing the rotation comprises: a gear supporting member also functioning as first joint member for pivotally supporting the first hinge shaft and the second hinge shaft toward the identical direction; an intermediate gear having a lower bevel tooth portion on a lower part and an upper bevel tooth portion on an upper part, wherein the intermediate gear is pivotally supported between a lower projecting portion and an upper projecting portion in a rotatable manner; a first gear meshed with the lower bevel tooth portion, wherein the rotation of the first gear is restricted by the first hinge shaft, so that the first gear is attached to the first hinge shaft; and a second gear meshed with the upper bevel tooth portion, wherein the rotation of the second gear is restricted by the second hinge shaft, so that the second gear is attached to the second hinge shaft.

Still further, the invention is characterized in that the means for generating friction torque consists of a first means for generating friction torque and a second means for generating friction torque; that the first means for generating friction torque comprises: a friction plate also functioning as second joint member; a first A friction washer and a first B friction washer provided on both sides of the lower part of the friction plate, between the first gear of the means for synchronizing the rotation and the cam plate member of the means for sucking of the biaxial hinge portion, such that the first A friction washer and the first B friction washer can rotate together with the first hinge shaft; and a first elastic means provided on the first hinge shaft for bringing the first A friction washer and the first B friction washer into press contact with the friction plate and the cam plate member; and that the second means for generating friction torque comprises: a friction plate also functioning as second joint member; a second A friction washer and a second B friction washer provided on both sides of the upper part of the friction plate, between the second gear of the means for synchronizing the rotation and the cam plate member of the means for sucking of the biaxial hinge portion, such that the second A friction washer and the second B friction washer can rotate together with the second hinge shaft; and a second elastic means provided on the second hinge shaft for bringing the second A friction washer and the second B friction washer into press contact with the friction plate and the cam plate member.

Still further, the invention is characterized in that the means for sucking consists of a first means for sucking and a second means for sucking; that the first means for sucking comprises: a first A cam concave portion and a first B cam concave portion, each having substantially a circular arc shape and provided outside a third A bearing hole of the cam plate member for bearing the first hinge shaft, wherein the cam plate member is provided such that the first hinge shaft and the second hinge shaft pass through the cam plate member in a rotatable manner; a first cam follower attached to the first hinge shaft, wherein the rotation of the first cam follower is restricted by the first hinge shaft, and the first cam follower comprises a first A cam convex portion on a side facing the first A cam concave portion and a first B cam convex portion on a side facing the first B cam concave portion; and a first elastic means for bringing the first A cam concave portion into press contact with the first A cam convex portion, as well as the first B cam concave portion with the first B cam convex portion; and that the second means for sucking comprises: a second A cam concave portion and a second B cam concave portion, each having substantially a circular arc shape and provided outside a third B bearing hole of the cam plate member for bearing the second hinge shaft, wherein the cam plate member is provided such that the first hinge shaft and the second hinge shaft pass through the cam plate member in a rotatable manner; a second cam follower attached to the second hinge shaft, wherein the rotation of the second cam follower is restricted by the second hinge shaft, wherein the second cam follower comprises a second A cam convex portion on a side facing the second A cam concave portion and a second B cam convex portion on a side facing the second B cam concave portion; and a second elastic means for bringing the second A cam concave portion into press contact with the second A cam convex portion, as well as the second B cam concave portion with the second B cam convex portion.

Still further, the electronic device according to the invention is characterized in that it uses one of the above-mentioned biaxial hinges.

Since the invention is structured as described above, the biaxial hinge according to the invention has the following advantages: when the first casing and the second casing open and close relative to each other, an operation means such as a means for sinking for the keyboard portion and the rubber feet start functioning, so as to ensure that the keyboard portion and the rubber feet can sink into the first casing; in this manner, when the first casing and the second casing are opened to form an opening angle of 360 degrees relative to each other, wherein the both casings overlap each other, the arrangement can prevent the keyboard portion and the rubber feet from protruding and hindering the handling and operation; moreover, the first casing and the second casing having rotated 360 degrees relative to each other via the means for synchronizing the rotation, the means for generating friction torque can ensure that the first casing and the second casing freely stop and maintain the position at the time of stop; and the means for sucking can assure an enhanced operability by allowing the both casings to automatically open and close at a predetermined angle, as well as assure an omission of a latching mechanism.

BRIEF DESCRIPTION OF THE DRAWINGS

FIGS. 12A and 12B show a friction washer of the biaxial hinge portion according to the invention, FIG. 12A being its perspective view as it is seen from right hand side and FIG. 12B, its perspective view as it is seen from left hand side;

EMBODIMENTS

Hereinafter, reference is made based on the drawings to the embodiments in which the biaxial hinge according to the invention is applied to the tablet notebook PC. However, the electronic devices using the biaxial hinge according to the invention are not limited to the tablet notebook PC, but the biaxial hinge is also applicable to other electronic devices which are assembled by coupling a first casing and a second casing, such that the casings can open and close by the biaxial hinge.

Moreover, those which can be operated by a biaxial hinge according to the invention are not limited to an operation means such as the means for sinking. The biaxial hinge can be used as an element for actuating various operation means provided on the first casing or the second casing.

Further, reference is made to means for synchronizing the rotation as component of means for controlling the rotation of the biaxial hinge according to the invention, which is applicable however to biaxial hinges wherein means for selectively controlling the rotation (as described in JP Patent Applications Nos. 2014-22109, 2014-30124, 2014-50201 and 2014-81423, and so on) serves as the means for controlling the rotation.

Figure 1A:
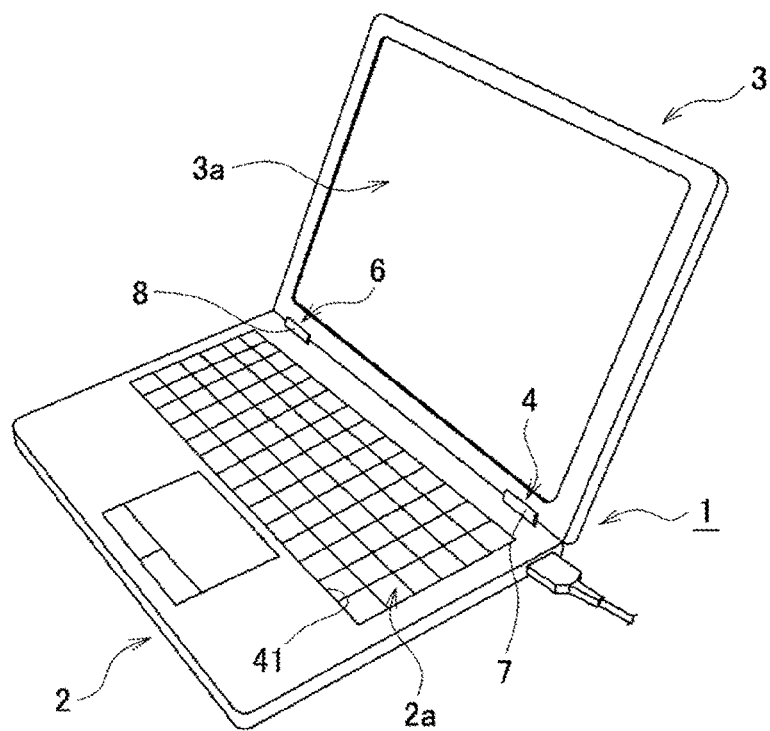
FIGS. 1A and 1B show a tablet notebook PC using a biaxial hinge according to the invention, FIG. 1A being its perspective view as it is seen from front side, while a first casing and a second casing are opened, and FIG. 1B being its perspective view as it is seen from rear side, while the first casing and the second casing are fully closed.
Figure 1B:
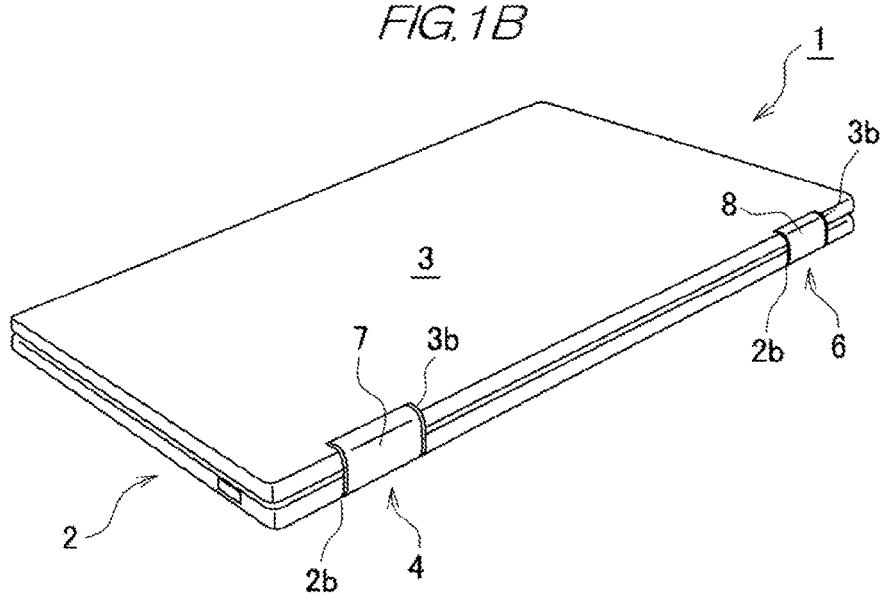

FIGS. 1A and 1B show a notebook PC 1 being an example of the electronic device using the biaxial hinge according to the invention. The notebook PC 1 comprises a first casing 2 provided with a key board portion 2a and a second casing 3 provided with a display portion 3a, wherein the casings are coupled via a pair of biaxial hinges 4 and 6 to each other at spots on the right and left sides of their respective rear portions such that the casings can open and close 360 degrees relative to each other; the display portion 3a provided on the second casing 3 is tablet-oriented, wherein it realizes a touch-operable function by hand. Furthermore, attaching concave portions 2b, 2b are provided on the rear portion of the first casing 2 for housing the biaxial hinges 4 and 6, while the attaching concave portions 3b, 3b on the rear portion of the second casing 3 for a similar purpose.

Since both the biaxial hinges 4 and 6 have an identical structure except that they are for their symmetrical with each other. Explanation will be exclusively made on the biaxial hinge 4, and not to other biaxial hinge 6. Of course, biaxial hinge denoted with reference numeral 6 can be manufactured in a manner different from the biaxial hinge 4, as long as the two hinges operate properly.

Furthermore, embodiments of the biaxial hinge portion 4a (see FIG. 3), as well as of means for sinking 40 and actuating mechanism 50 being examples of an operation means as described below are not limited to what is shown in drawings.

FIGS. 2 to 17 show an embodiment of the biaxial hinge 4 according to the invention. The biaxial hinge 4 according to the invention consists of the biaxial hinge portion 4a and the actuating mechanism 50. First, reference is made to the biaxial hinge portion 4a of the biaxial hinge 4. Particularly in FIGS. 2 to 5, a reference numeral 10 denotes the first hinge shaft of the biaxial hinge portion 4a. Particularly as shown in FIGS. 5, 6A and 6B, the first hinge shaft 10 comprises, as it is seen from one end, an attaching plate portion 10a having a flat cross section, wherein attaching holes 10b, 10b are provided on its surface; a flange portion 10c provided next to the attaching plate portion 10a; a circular shaft portion 10d provided next to the flange portion 10c; a first deformed shaft portion 10e provided next to the second circular shaft portion 10e and finished by cutting off both sides of a simple extension of the circular shaft portion so as to have a substantially elliptic cross section; a second deformed shaft portion 10f provided next to the first deformed shaft portion 10e and finished by cutting off both sides of a simple extension of the first deformed shaft portion so as to have a substantially elliptic cross section slightly thinner than the first deformed shaft portion 10e; and a male screw portion 10g provided next to the second deformed shaft portion 10f.

Figure 2:
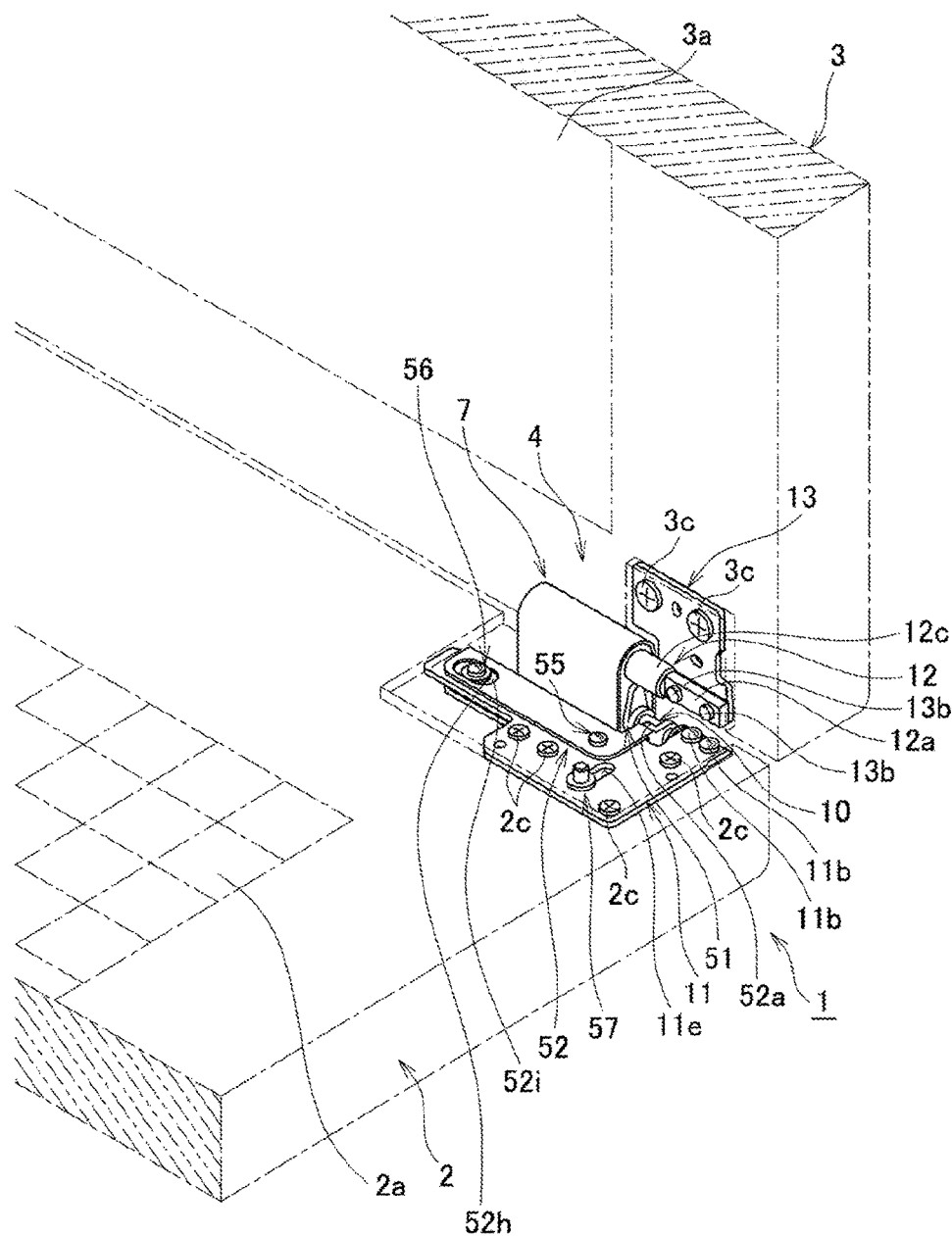
FIG. 2 shows a perspective view of the biaxial hinge according to the invention in its attached state to the notebook PC.
Figure 3:
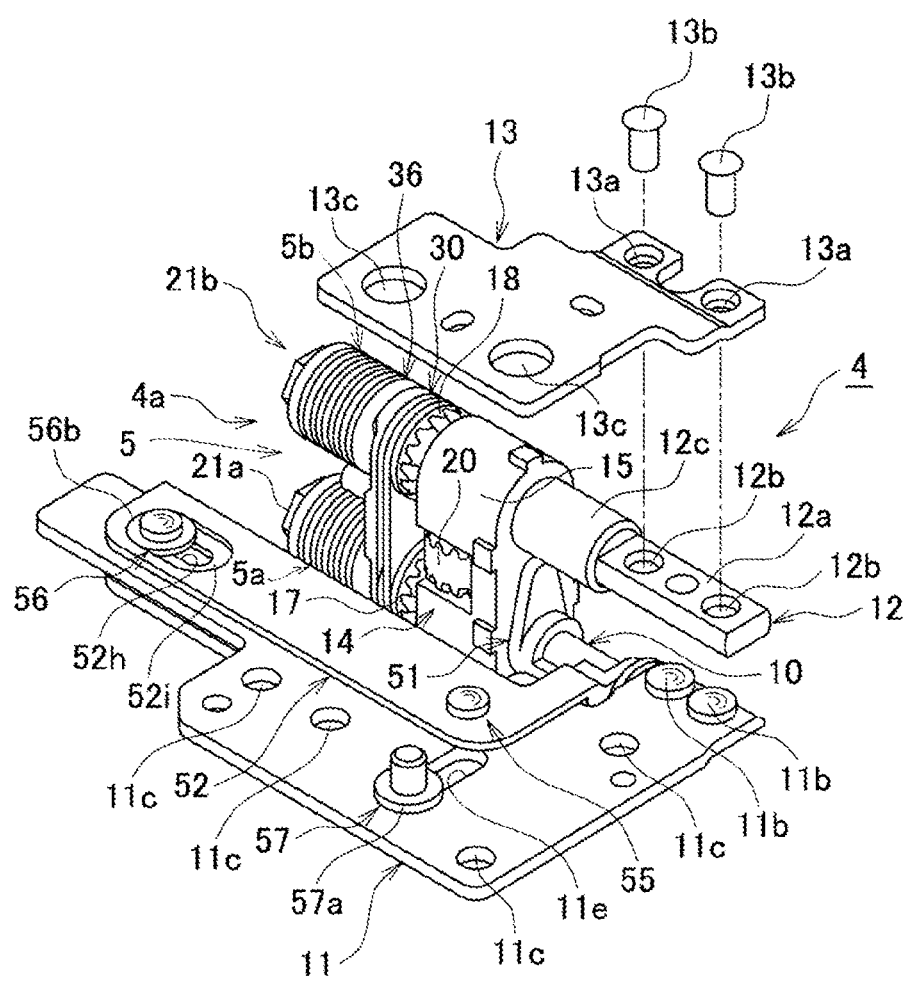
FIG. 3 shows a partially exploded perspective view of the biaxial hinge according to the invention with a hinge case being removed from it.
Figure 4:
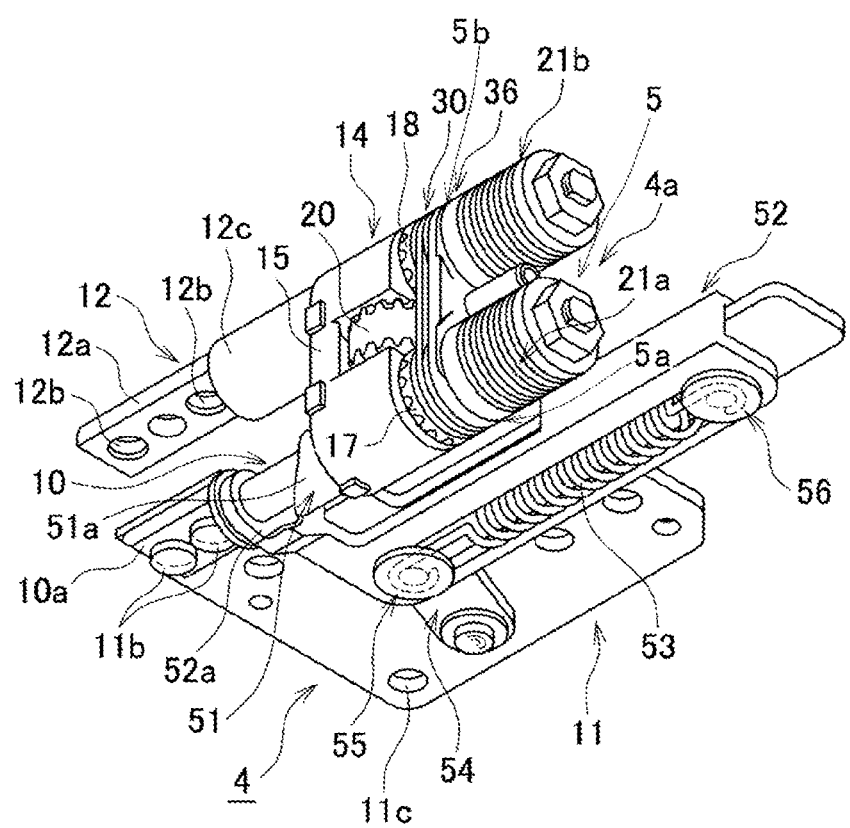
FIG. 4 shows a perspective view of the biaxial hinge according to the invention with a second attaching plate of a biaxial hinge portion being removed from it, as it is seen from below.

As shown in FIGS. 2 to 4, the first attaching plate 11 is attached to the attaching plate portion 10a of the first hinge shaft 10; as per mode of attaching, the former is attached to the latter by caulking respective ends of flanged attaching pins 11b, 11b, as the attaching pins pass through the two attaching holes 10b, 10b of the first hinge shaft 10 and attaching holes 11a, 11a of the first attaching plate 11. And then, the first attaching plate 11 is attached to an upper surface side of the first casing 2 using attaching screws 2c, 2c . . . via attaching holes 11c, 11c . . . provided on the first attaching plate 11. In the meantime, attaching screws with nuts can be used instead of the attaching pins 11b, 11b.

Figure 5:
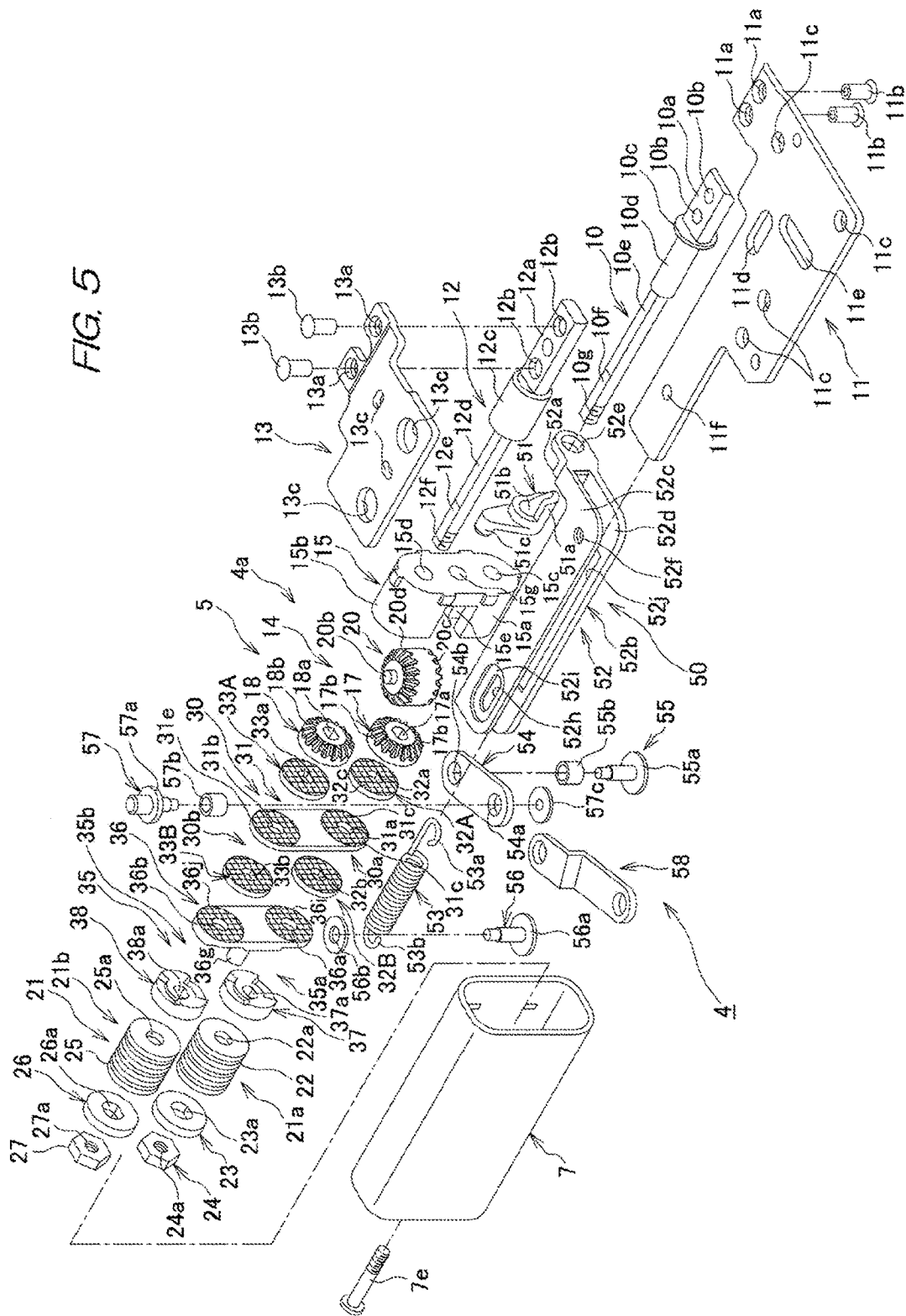
FIG. 5 shows a partially exploded perspective view of the biaxial hinge portion of a biaxial hinge according to the invention.
Figure 6A:
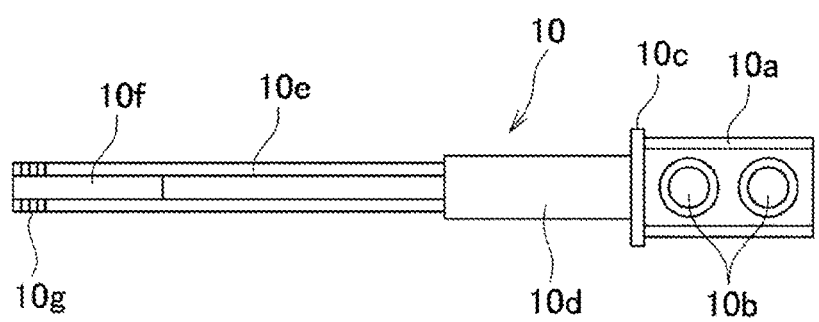
FIGS. 6A and 6B show a first hinge shaft of the biaxial hinge portion according to the invention, FIG. 6A being its plan view, and FIG. 6B, its elevation view.
Figure 6B:
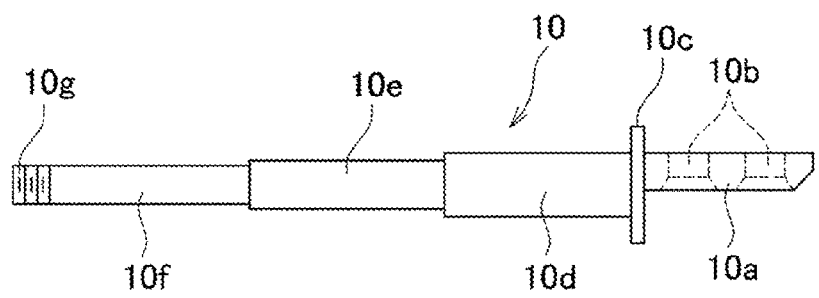
Figure 7A:
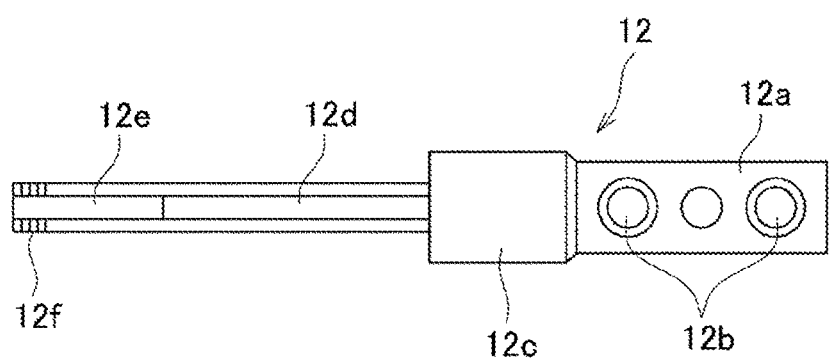
FIGS. 7A and 7B show a second hinge shaft of the biaxial hinge portion according to the invention, FIG. 7A being its plan view, and FIG. 7B, its elevation view.
Figure 7B:
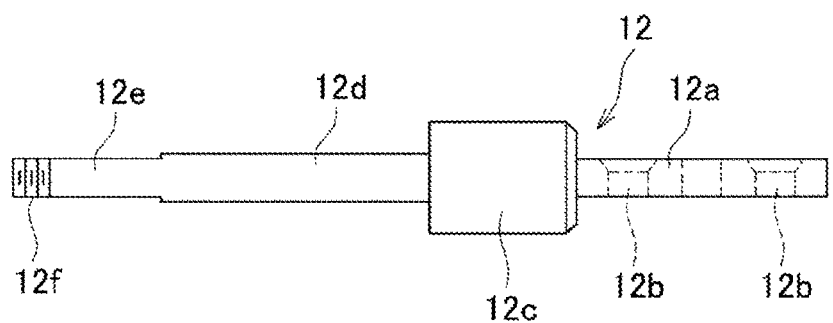
Figure 8A:
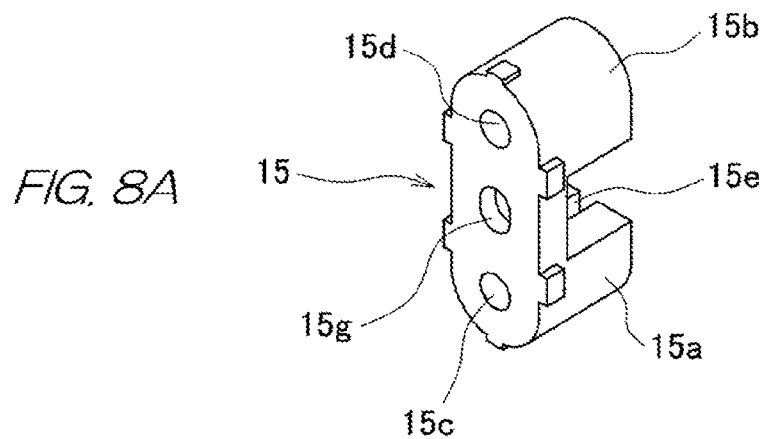
FIGS. 8A to 8C show a gear supporting member of the biaxial hinge portion according to the invention, FIG. 8A being its perspective view, FIG. 8B, its side view and FIG. 8C, its cross sectional view in A-A line of FIG. 8B.
Figure 8B:
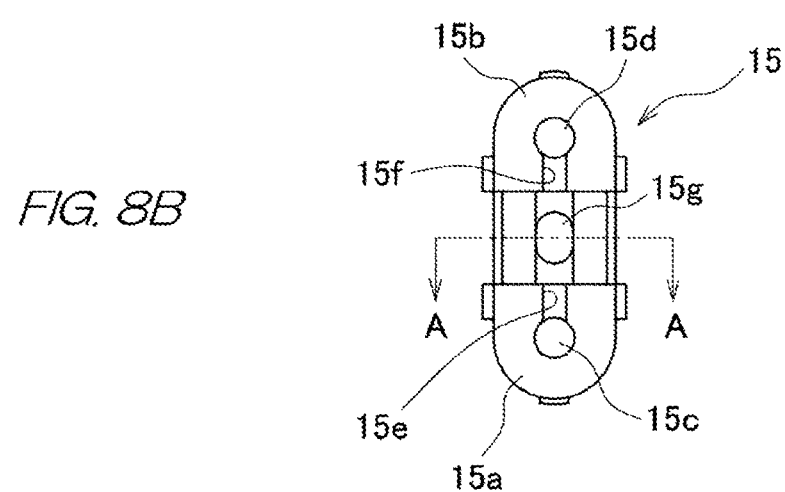
Figure 8C:

Next, particularly as shown in FIGS. 2, 5, 7A and 7B, a reference numeral 12 denotes the a second hinge shaft, which is placed above and in parallel to the first hinge shaft 10. The second hinge shaft 12 comprises, as it is seen from one end in particular as shown in FIGS. 5, 7A and 7B, an attaching plate portion 12a having a flat cross section, wherein attaching holes 12b, 12b are provided on its surface; a circular shaft portion 12c provided next to the attaching plate portion 12a; a first deformed shaft portion 12d provided next to the circular shaft portion 12c and having a substantially elliptic cross section; a second deformed shaft portion 12e provided next to the first deformed shaft portion 12d and being slightly thinner than the first deformed shaft portion 12d; and a male screw portion 12f provided next to the second deformed shaft portion 12e.

Particularly as shown in FIGS. 2 to 4, the first hinge shaft 10 and the second hinge shaft 12 respectively pass through a first A bearing hole 15c and a first B bearing hole 15d (spaced apart at a predetermined interval and thus facing each other) provided on a gear supporting member 15 of the means for synchronizing the rotation 14 also functioning as first joint member (to be described below); then through a second A bearing hole 31a and a second B bearing hole 31b (spaced apart at a predetermined interval and thus facing each other) provided on the friction plate 31 of the means for generating friction torque 30 also functioning as second joint member (to be described below); and then through a third A bearing hole 36a and a third B bearing hole 36b (spaced apart at a predetermined interval and thus facing each other) provided on a cam plate 36 of the means for sucking 35 also functioning as third joint member; on the other hand, the first hinge shaft 10 and the second hinge shaft 12, having passed through their respective bearing holes, are able to rotate. Due to their arrangement as described above, the hinge shafts are pivotally supported in parallel to each other.

As shown in FIG. 2 and FIG. 3, a second attaching plate 13 is attached to the attaching plate portion 12a; as per mode of attaching, the former is attached to the latter by caulking respective ends of flanged attaching pins 13b, 13b, as the attaching pins pass through attaching holes 12b, 12b of the second hinge shaft 12 and attaching holes 13a, 13a of the second attaching plate 13. And then, the second attaching plate 13 is attached to a lower surface side of the second casing 3 using attaching screws 3c, 3c . . . via attaching holes 13b, 13b . . . provided on the second attaching plate 13. In the meantime, attaching screws with nuts can be used instead of the attaching pins 13b, 13b.

Next, reference is made to means for controlling the rotation 5 provided between the first hinge shaft 10 and the second hinge shaft 12 of the biaxial hinge portion 4a. The means for controlling the rotation 5 consists of the first means for controlling the rotation 5a and the second means for controlling the rotation 5b. The first means for controlling the rotation 5a and the second means for controlling the rotation 5b respectively consist of the means for synchronizing the rotation 14, the elastic means 21, the means for generating friction torque 30 and the means for sucking 35. More specifically, the first means for controlling the rotation 5a consists of the means for synchronizing the rotation 14, the first elastic means 21a, the first means for generating friction torque 30a and the first means for sucking 35a. The second means for controlling the rotation 5b also consists of the means for synchronizing the rotation 14, the second elastic means 21b, the second means for generating friction torque 30b and the second means for sucking 35b.

Figure 9:
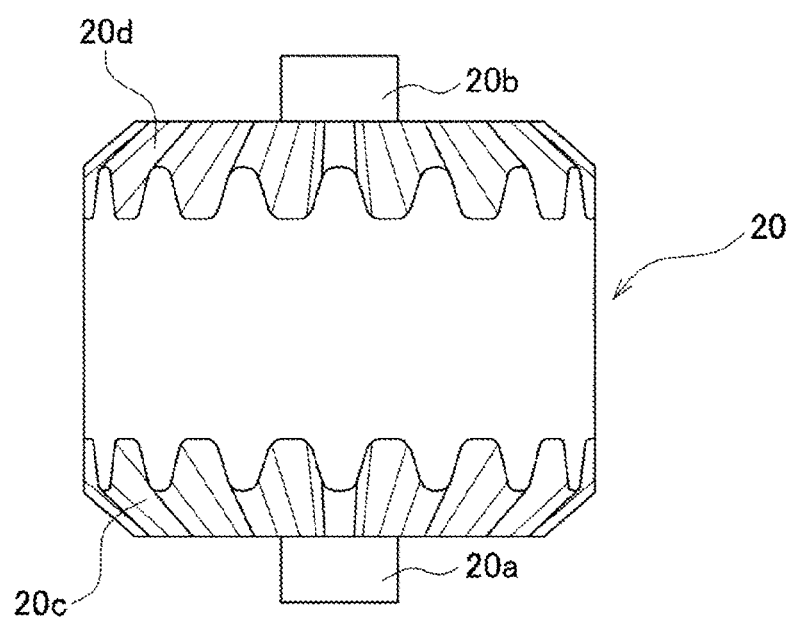
FIG. 9 shows an elevation view of an intermediate gear of the biaxial hinge portion according to the invention.
Figure 10:
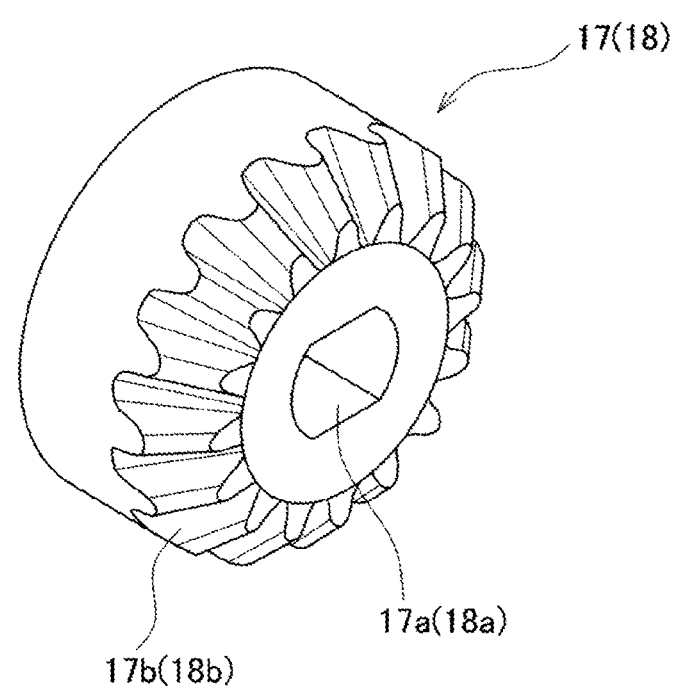
FIG. 10 shows a perspective view of a first gear and the second gear of the biaxial hinge portion according to the invention.

Therefore, reference is first made to the means for synchronizing the rotation 14. Particularly as shown in FIG. 3 to FIG. 5 and FIG. 8: the means for synchronizing the rotation 14 comprises the gear supporting member 15 also functioning as first joint member, wherein the gear supporting member 15 comprises the first A bearing hole 15c provided on the lower projecting portion 15a and the first B bearing hole 15d provided on the upper projecting portion 15b, and the second circular shaft portion 10e of the first hinge shaft 10 passes through the first A bearing hole 15c in a rotatable manner; the intermediate gear 20—especially as shown in FIG. 9—provided between the lower projecting portion 15a and the upper projecting portion 15b in a rotatable manner, wherein the intermediate gear comprises a lower supporting shaft 20a provided coaxially with a first shaft supporting groove 15e provided on a lower side of the upper projecting portion 15b of the gear supporting member 15, and an upper supporting shaft 20b provided coaxially with a second shaft supporting groove 15f provided on an upper side of the lower projecting portion 15a of the gear supporting member 15, wherein the lower supporting shaft 20a is rotatably inserted into and supported by a first shaft supporting groove 15e, and the upper supporting shaft 20b is rotatably inserted into and supported by a second shaft supporting groove 15f; the first gear 17—especially as shown in FIG. 10, meshed with a lower bevel tooth portion 20c, wherein the second deformed shaft portion 10f of the first hinge shaft 10 passes through a deformed insertion hole 17a provided in an axial direction on the center of the first gear to engage with the deformed insertion hole and the second gear 18—especially as shown in FIG. 10—meshed with an upper bevel tooth portion 20d of the intermediate gear 20, wherein the first deformed shaft portion 12e of a second hinge shaft 12 passes through a deformed insertion hole 18a provided in an axial direction on the center of the second gear to engage with the deformed insertion hole. In the meantime, the first gear 17 and the second gear 18 have an identical structure, so the first gear 17 only is shown in FIG. 10, the reference numeral for the second gear 18 in parentheses being just attached thereto. Still further, an elliptic hole provided substantially on the center of the gear supporting member 15 is a locking hole 15g for a cam member 51 of the actuating mechanism 50 as described below.

Next, reference is made to the elastic means 21 provided on respective tips of the first hinge shaft 10 and the second hinge shaft 12 of the biaxial hinge portion 4a. Particularly as shown in FIGS. 3 to 5, the elastic means 21 consists of the first elastic means 21a on the first hinge shaft side and the second elastic means 21b on the second hinge shaft side. As shown in the above mentioned figures, the first elastic means 21a comprises the first elastic member 22 consisting of a plurality of disc springs, spring washers or the like, wherein the first deformed shaft portion 10f of the first hinge shaft 10 passes through a circular insertion hole 22a provided in the first elastic member 22, and then the disc springs or the like overlap each other; a first backing washer 23 provided next to the first elastic member 22, wherein the first deformed shaft portion 10g passes through a deformed insertion hole 23a of the first backing washer to engage with the deformed insertion hole; and a first fastening nut 24 provided next to the first backing washer 23, wherein the male screw portion 10g of the first hinge shaft 10 is screwed into a female screw hole 24a of the first fastening nut.

Particularly as shown in FIGS. 3 to 5, the second elastic means 21b comprises the second elastic member 25 consisting of a plurality of disc springs, spring washers or the like, wherein the second deformed shaft portion 12f of the second hinge shaft 12 passes through a circular insertion hole 26a provided in the second elastic member, and then the disc springs or the like overlap each other; a second backing washer 26 provided next to the second elastic member 25, wherein the second deformed shaft portion 12e passes through a deformed insertion hole 26a of the second backing washer to engage with the deformed insertion hole; and a second fastening nut 27 provided next to the second backing washer 26, wherein the male screw portion 12f of the second hinge shaft 12 is screwed into a female screw hole 27a of the second fastening nut.

The elastic means 21 applies a press contact force to the means for generating friction torque 30 and the means for sucking 35, as described below, so that the former can exert a friction torque generating function while the latter a sucking function, when the first hinge shaft 10 and the second hinge shaft 12 rotate respectively.

In the following, reference is made to the means for generating friction torque 30. Particularly as shown in FIGS. 3 to 5, the means for generating friction torque 30 is provided next to a means for synchronizing the rotation 14, and consists of the first means for generating friction torque 30a on the lower part and the second means for generating friction torque 30b on the upper part. Particularly as shown in FIGS. 3 to 5, the first means for generating friction torque 30a comprises the first A friction washer 32A, the first B friction washer 32B, wherein the first A friction washer 32A and the first B friction washer 32B are provided on both sides of a lower part of the friction plate 31 comprising the second A bearing hole 31a and the second B bearing hole 31b, wherein the first deformed shaft portion 10e of the first hinge shaft 10 passes through the second A bearing hole 31a in a rotatable manner, as does a first deformed shaft portion 12e of the second hinge shaft 12 through the second B bearing hole 31b; in this manner, the first A friction washer 32A and the first B friction washer 32B are assembled by allowing the first deformed shaft portion 10f of the first hinge shaft 10 to pass through a first deformed insertion hole 32a and a second deformed insertion hole 32b to engage with these deformed insertion holes; and the first elastic means 21a as described above.

The first A friction washer 32A is sandwiched between one side of the lower part of the friction plate 31 and the first gear 17 of the means for synchronizing the rotation 14, while the first B friction washer 32B between other side of the lower part of the friction plate 31 and one side of the lower part of the cam plate member 36 of the means for sucking 35. Furthermore, the first A friction washer 32A and the first B friction washer 32B rotate together with a first gear 17, when the first hinge shaft 10 starts the rotation; here the first A friction washer 32A is designed such that a friction torque is generated between the first A friction washer 32A and one side of a friction plate 31, and the first B friction washer 32B is designed such that a friction torque is generated between the first B friction washer 32B, the other side of the friction plate 31 and one side of a lower part of a cam plate member 36. In this manner, both sides of the first A friction washer 32A and the first B friction washer 32B, as well as of the friction plate 31, and one side of the cam plate member 36, which are all designed for generating a friction torque, are provided with waffle-knurl pattern portions 32c, 32d; 31c, 31d; 32e, 32f; 36i, so as to enhance durability. In the meantime, a waffle-knurl pattern portion 32c on the side of the first A friction washer 32A contacting a first gear 17 can be omitted.

Particularly as shown in FIGS. 3 to 5, the second means for generating friction torque 30b comprises the second A friction washer 33A, the second B friction washer 33B, wherein the second A friction washer 33A and the second B friction washer 33B are provided on both sides of an upper part of the friction plate 31 comprising the second A bearing hole 31a and the second B bearing hole 31b, wherein the first deformed shaft portion 10e of the first hinge shaft 10 and the first deformed shaft portion 12d of the second hinge shaft 12 pass through the second A bearing hole 31a and the second B bearing hole 31b in a rotatable manner; in this manner, the second A friction washer 33A and the second B friction washer 33B are assembled by allowing the first deformed shaft portion 12e of the second hinge shaft 12 to pass through the first deformed insertion hole 32a and the second deformed insertion hole 32b to engage with these deformed insertion holes, and the second elastic means 21b as described above. The second A friction washer 33A is sandwiched between one side of the upper part of the friction plate 31 and the second gear 18 of the means for synchronizing the rotation, while the second B friction washer 33B between other side of the upper part of the friction plate 31 and one side of the upper part of a cam plate member 36 of a means for sucking 35. Furthermore, the second A friction washer 33A and the second B friction washer 33B rotate together with the second gear 18, when the second hinge shaft 12 starts the rotation; here, the second A friction washer 33A is designed such that a friction torque is generated between the second A friction washer 33A and one side of the friction plate 31, and the second B friction washer 33B is designed such that a friction torque is generated between the second B friction washer 33B, one side of the friction plate 31 and one side of an upper part of the cam plate member 36.

Figure 11A:
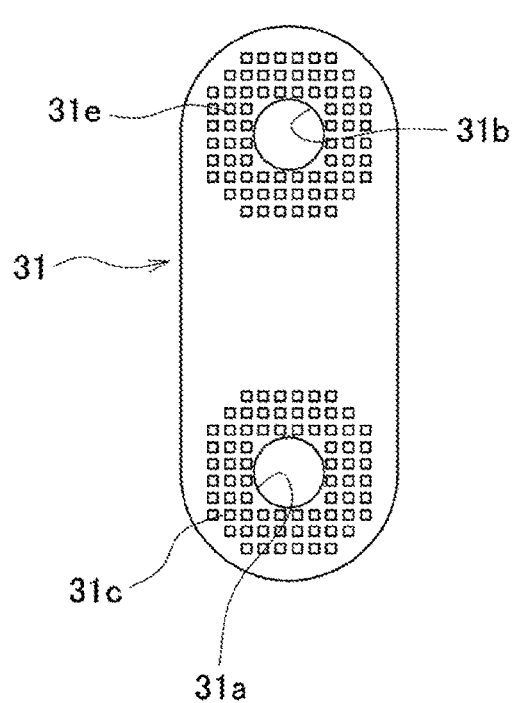
FIGS. 11A and 11B show a friction plate of a biaxial hinge portion according to the invention, which also functions as a second joint member, FIG. 11A being its right hand side view and FIG. 11B, its left hand side view.
Figure 11B:
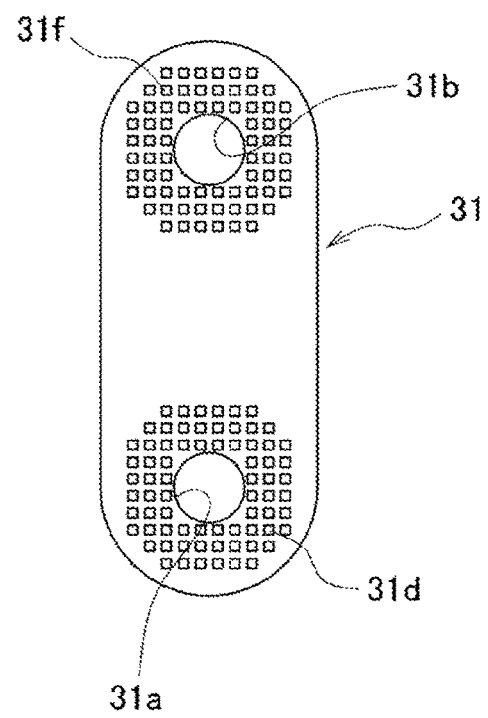

In this manner, both sides of the second A friction washer 33A and the second B friction washer 33B, as well as of the friction plate 31, and one side of the upper part of the cam plate member 36, which are all designed for generating a friction torque, are provided with the waffle-knurl pattern portions 33c, 33d, 31e, 31f, 33e, 33f, 36j especially as shown in FIGS. 5, 11 and 12, so as to enhance durability. In the meantime, a waffle-knurl pattern portion 33c on the side of the second A friction washer 33A contacting a second gear 18 can be omitted.

Next, the means for sucking 35 is provided next to the means for generating friction torque 30, more specifically between this and the elastic means 21. The means for sucking 35 consists of the first means for sucking 35a below, i.e. on the first hinge shaft side and the second means for sucking 35b above, i.e. on the second hinge shaft side.

Figure 13A:
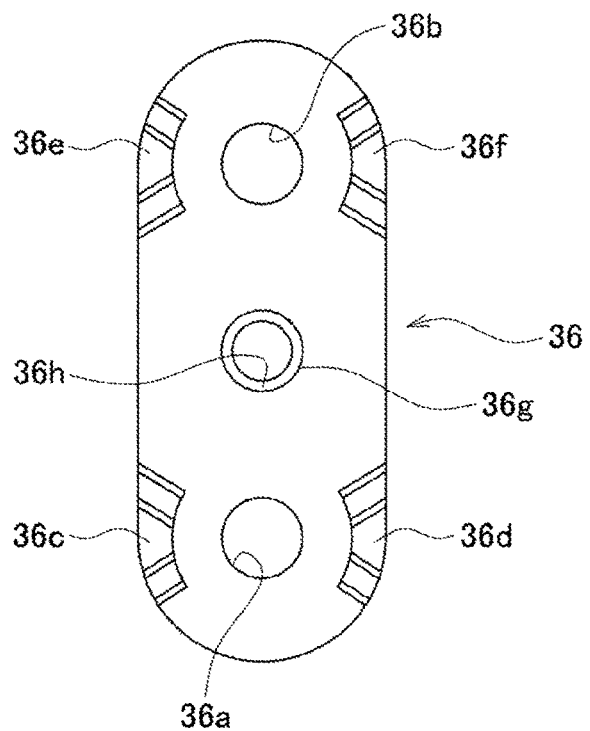
FIGS. 13A and 13B show a cam plate member of the biaxial hinge portion according to the invention, which also functions as third joint member and additional friction plate, FIG. 13A being its perspective view as it is seen from the side of a means for sucking and FIG. 13B, its elevation view.
Figure 13B:
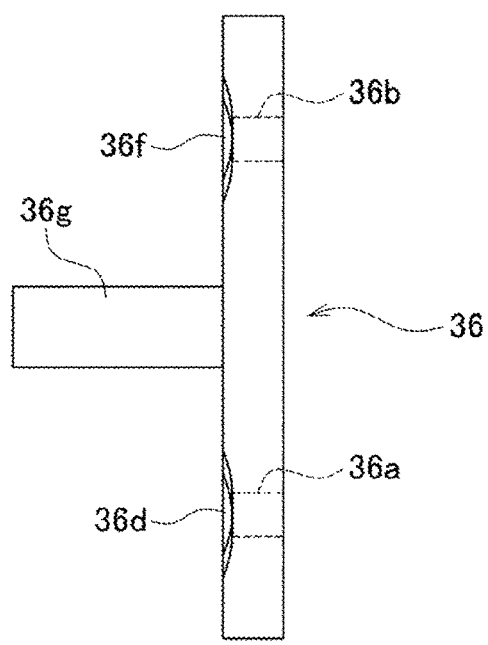
Figure 14A:
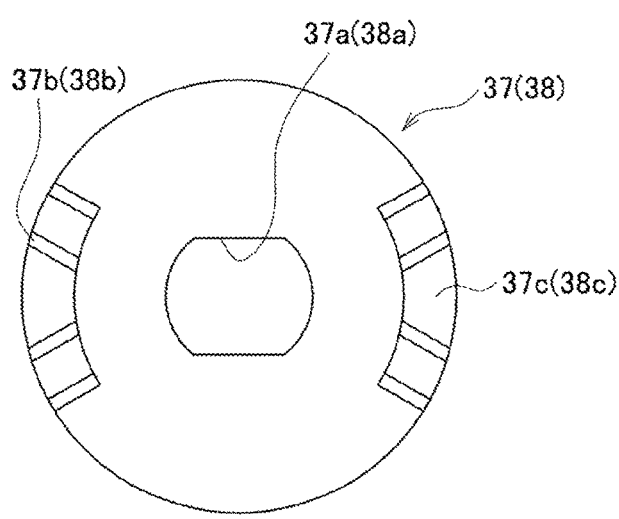
FIGS. 14A to 14C show first and second cam followers of the biaxial hinge portion according to the invention, FIG. 14A being their plan view, FIG. 14B, right hand side view and FIG. 14C, their elevation views.
Figure 14B:
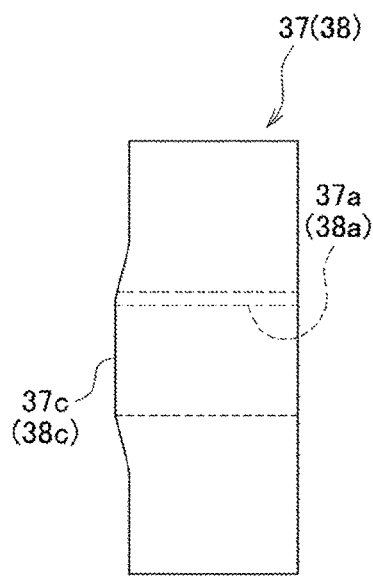
Figure 14C:
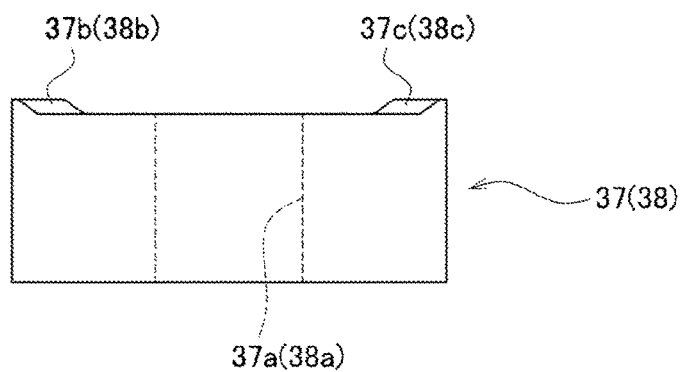

Particularly as shown in FIG. 13, the first means for sucking 35a comprises the first A cam concave portion 36c and the first B cam concave portion 36d, each having a circular arc shape and provided below on one side of the third A bearing hole 36a of the cam plate member 36 also functioning as third joint member; the first means for sucking 35a further comprises the first cam follower 37, wherein the second deformed shaft portion 10e of the first hinge shaft 10 passes through to engage with a deformed insertion hole 37a of the first cam follower, so that the second deformed shaft portion is restrained by the deformed insertion hole; the first cam follower comprises the larger first A cam convex portion 37b and the smaller first B cam convex portion 37c, of which the first A cam convex portion is provided opposite to the first A cam concave portion 36c, and the first B cam convex portion to the first B cam concave portion 36d; the first means for sucking 35a further comprises the first elastic means 21a contacting the first cam follower 37 so as to bring the cam plate member 36 into press contact with the first cam follower 37. In the meantime, a projection 36g is provided on one side of the cam plate member 36, a female thread portion 36h is provided on the projection 36g for attaching a hinge case.

Particularly as shown in FIG. 13, the second means for sucking 35b comprises the second A cam concave portion 36e and the second B cam concave portion 36f, each having a circular arc shape and provided above on a third B bearing hole 36b of the cam plate member 36 also functioning as third joint member; the second means for sucking 35b further comprises the second cam follower 38, wherein a second deformed shaft portion 12d of the second hinge shaft 12 passes through to engage with a deformed insertion hole 38a of the second cam follower, so that the second deformed shaft portion is restrained by the deformed insertion hole; the second cam follower comprises the larger second A cam convex portion 38b and the smaller second B cam convex portion 38c, of which the second A cam convex portion is provided opposite to the second A cam concave portion 36e, and the second B cam convex portion to the second B cam concave portion 36f; the second means for sucking 35b further comprises the second elastic means 21b contacting the second cam follower 38 so as to bring the cam plate member 36 into press contact with the second cam follower 38. In the meantime, the rotation of the first cam follower 37 is restricted by the first hinge shaft 10 and that of the second cam follower 38 by the second hinge shaft 12, but both hinge shafts are slidable in an axial direction.

Still further, in particular as shown in FIG. 5, the cam plate member 36 also functions as an additional friction plate of the means for generating friction torque 30 by waffle-knurl pattern portions 36i, 36j provided respectively around a third A bearing hole 36a below and a third B bearing hole 36b above on one side.

Figure 15A:
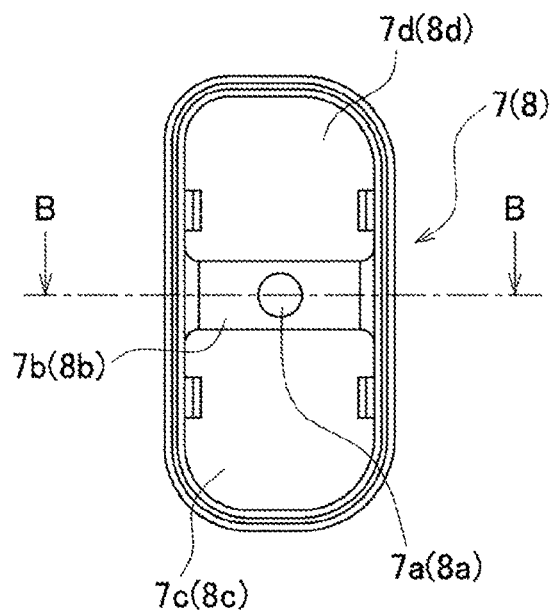
FIGS. 15A and 15B show the hinge case of the biaxial hinge portion according to the invention, FIG. 15A being its side view and FIG. 15B—its cross sectional view in B-B line of FIG. 15A.
Figure 15B:
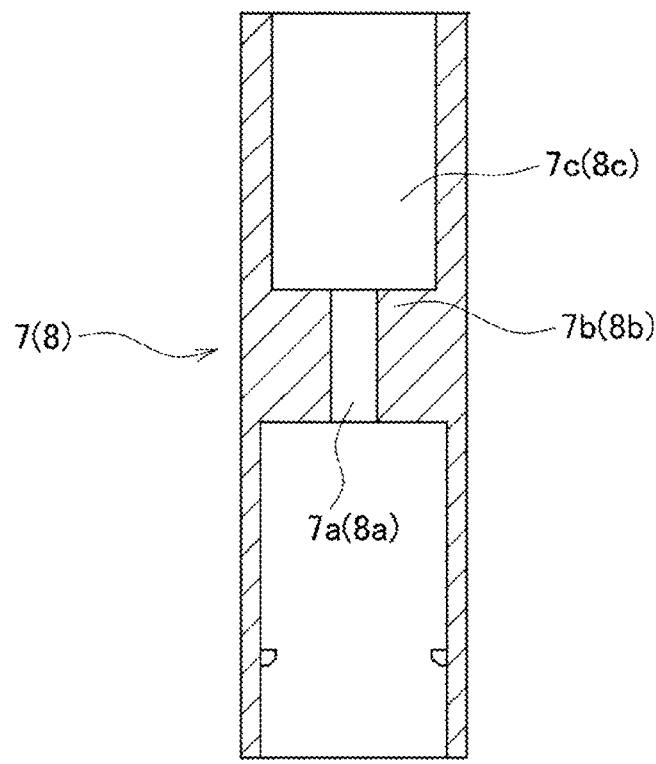
Figure 16A:
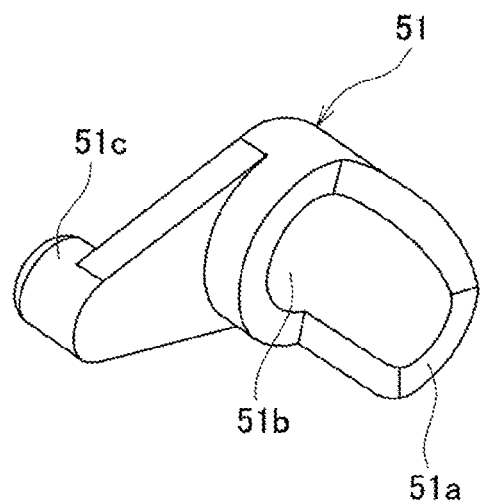
FIGS. 16A and 16B show a fixed cam member of the actuating mechanism in the biaxial hinge portion according to the invention, FIG. 16A being its perspective view as it is seen from above and FIG. 16B, its perspective view as it is seen from below.
Figure 16B:
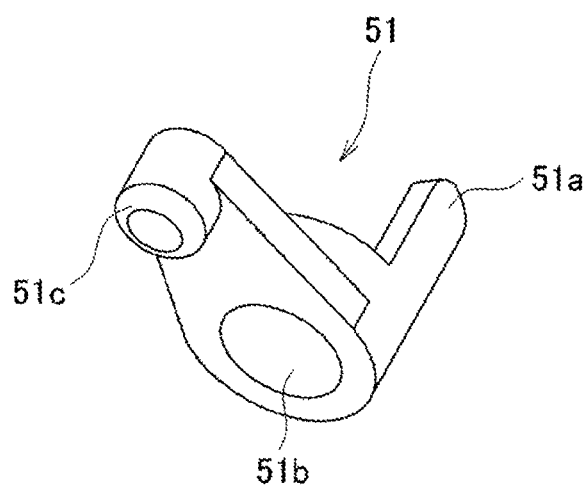
Figure 17A:
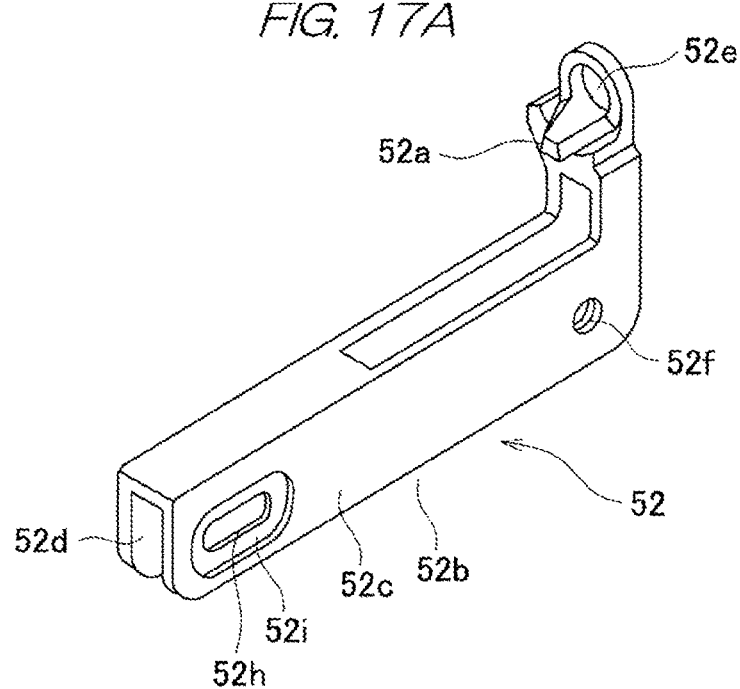
FIGS. 17A and 17B show a slide cam member of the actuating mechanism in the biaxial hinge portion according to the invention, FIG. 17A being its perspective view as it is seen from one side and FIG. 17B, its perspective view as it is seen from other side.
Figure 17B:
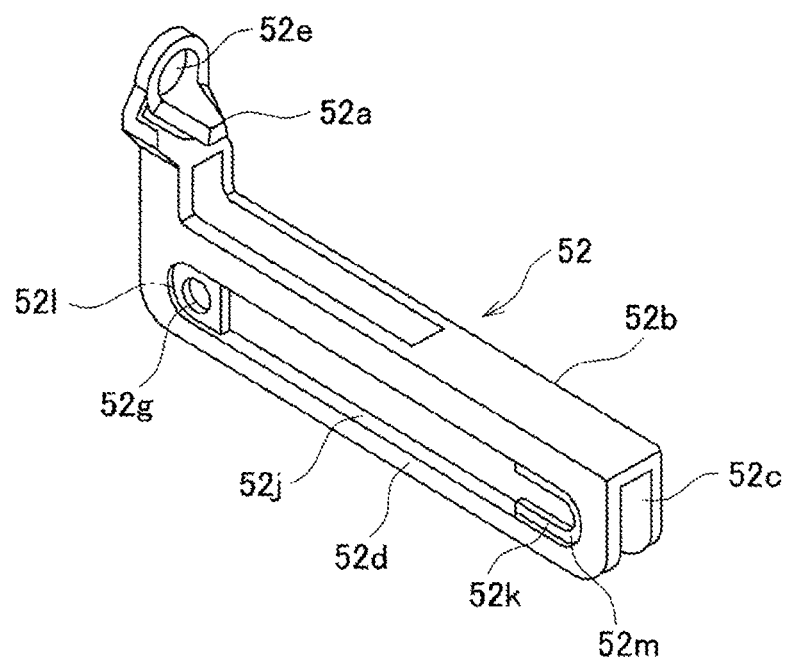
Figure 18:
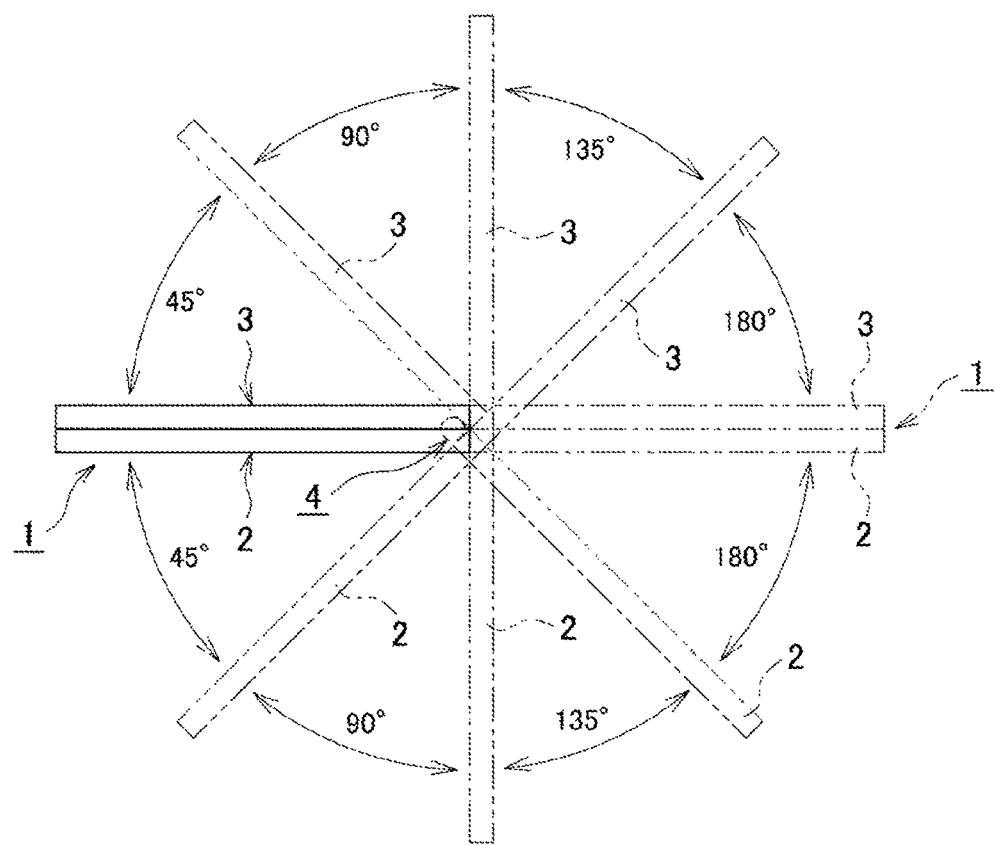
FIG. 18 is an explanatory view illustrating a state of the first casing and the second casing of a small size electronic device using the biaxial hinge according to the invention, when casings open and close relative to each other.

In the meantime, it is recommended to attach the hinge case 7 to the biaxial hinge portion 4a, wherein the hinge case houses a means for controlling the rotation 5 including elements from a means for synchronizing the rotation 14 to an elastic means 21. Particularly as shown in FIGS. 2, 5 and 15, the hinge case 7 has a cross section in shape of oblong hole and is a cylindrical body; in the hinge case, an attaching portion 7b is provided, wherein an attaching hole 7a is provided crossing the center of the attaching portion. The hinge case 7 houses the means for synchronizing the rotation 14, the means for generating friction torque 30, the means for sucking 35 and the elastic means 21. And then, the hinge case is attached using an attaching screw 7e to a female screw portion 36h provided on the projection 36g on the cam plate member 36, via the attaching hole 7a provided on the attaching portion 7b. Moreover, the hinge case houses the means for synchronizing the rotation 14, the first means for generating friction torque 30a and the first means for sucking 35a, and the first elastic means 21a, on its lower housing portion 7c side, as it does with a means for synchronizing the rotation 14, a second means for generating friction torque 30b and a second means for sucking 35b, and a second elastic means 21b on its upper housing portion 7d side. A representation of the internal structure of a hinge case 8 on drawings is omitted. However, the hinge case 8 has a structure identical to the hinge case 7, and the former just has several elements with reference numerals different from those for the latter, as shown in FIG. 15. In other words, it has an attaching hole 8a, an attaching portion 8b, a lower housing portion 8c and an upper housing portion 8d.

Still further, particularly as shown in FIG. 2, the hinge case 7 is housed in the attaching concave portion 2b provided on the first casing 2 and attaching concave portions 3b provided on the second casing 3, while the first casing 2 and the second casing 3 of the notebook PC 1 connected by the biaxial hinge 4 are closed.

Figure 19:
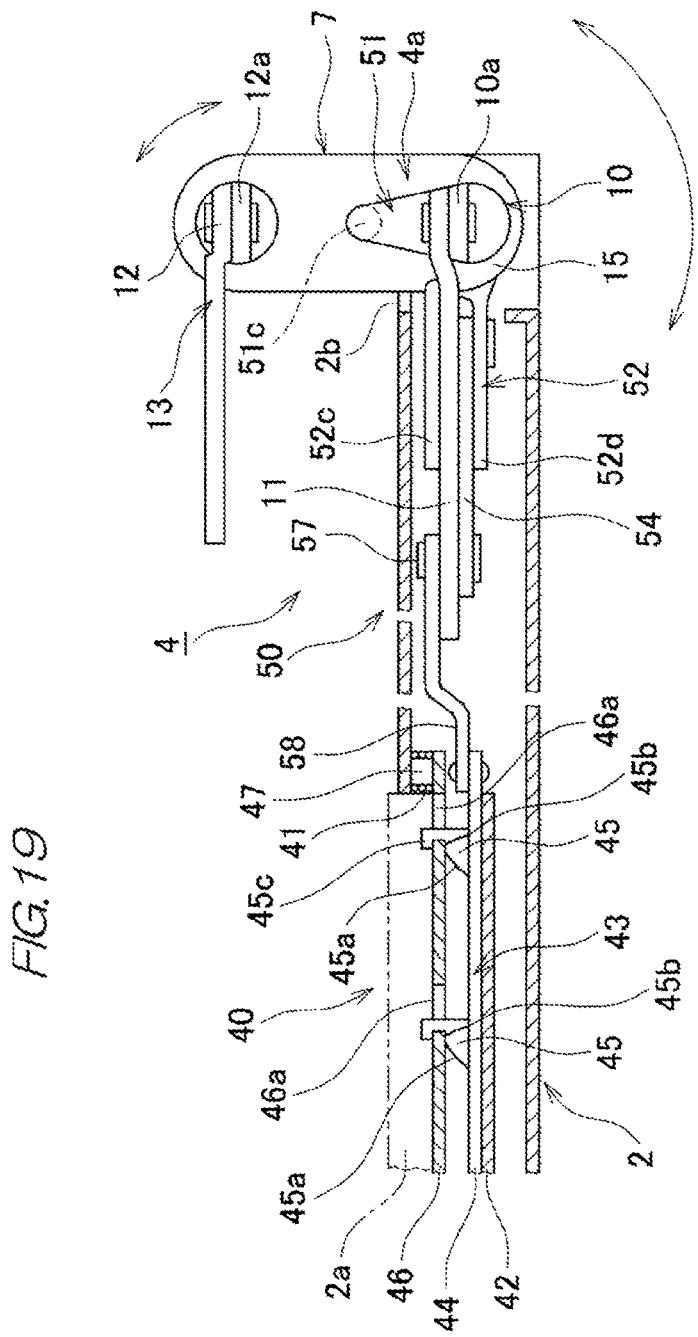
FIG. 19 is an explanatory view illustrating an operation of means for sinking and the actuating mechanism (examples of the operation means) of the biaxial hinge according to the invention, when the first casing and the second casing form an opening and closing angle of 0 degree.
Figure 21:
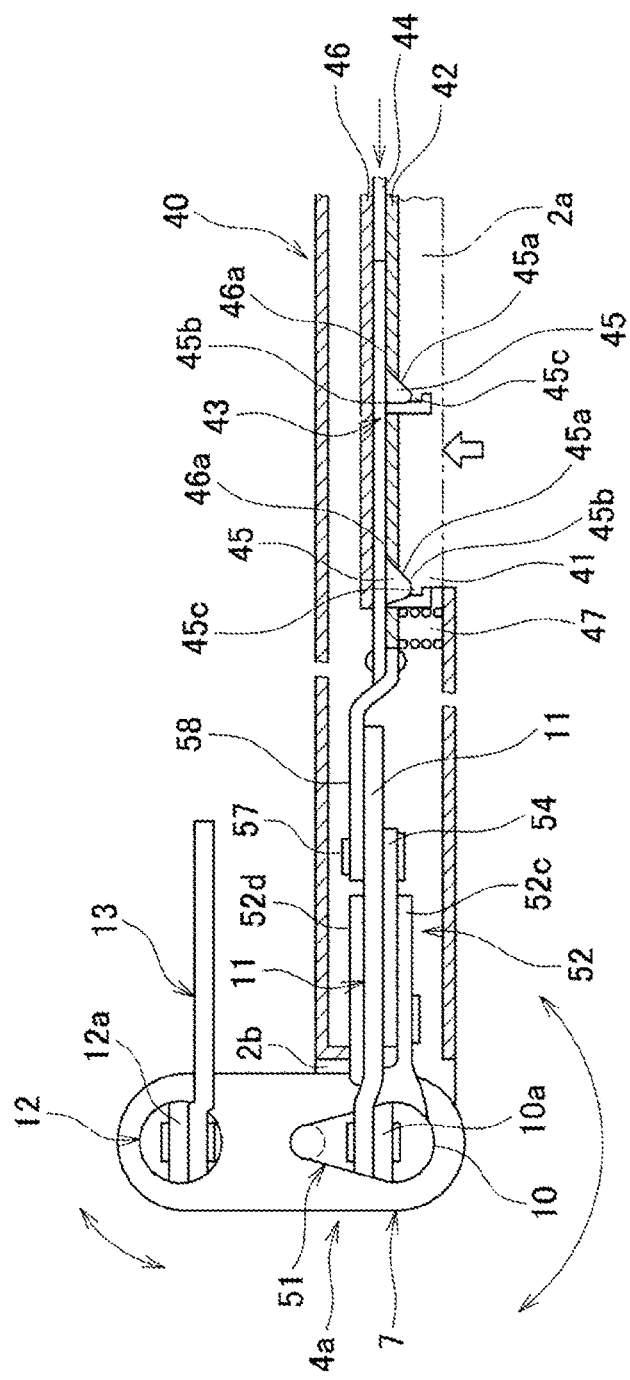
FIG. 21 is an explanatory view illustrating an operation of the means for sinking and the actuating mechanism (examples of the operation means) of a biaxial hinge according to the invention, when the first casing and the second casing form an opening and closing angle of 180 degrees.
Figure 22:
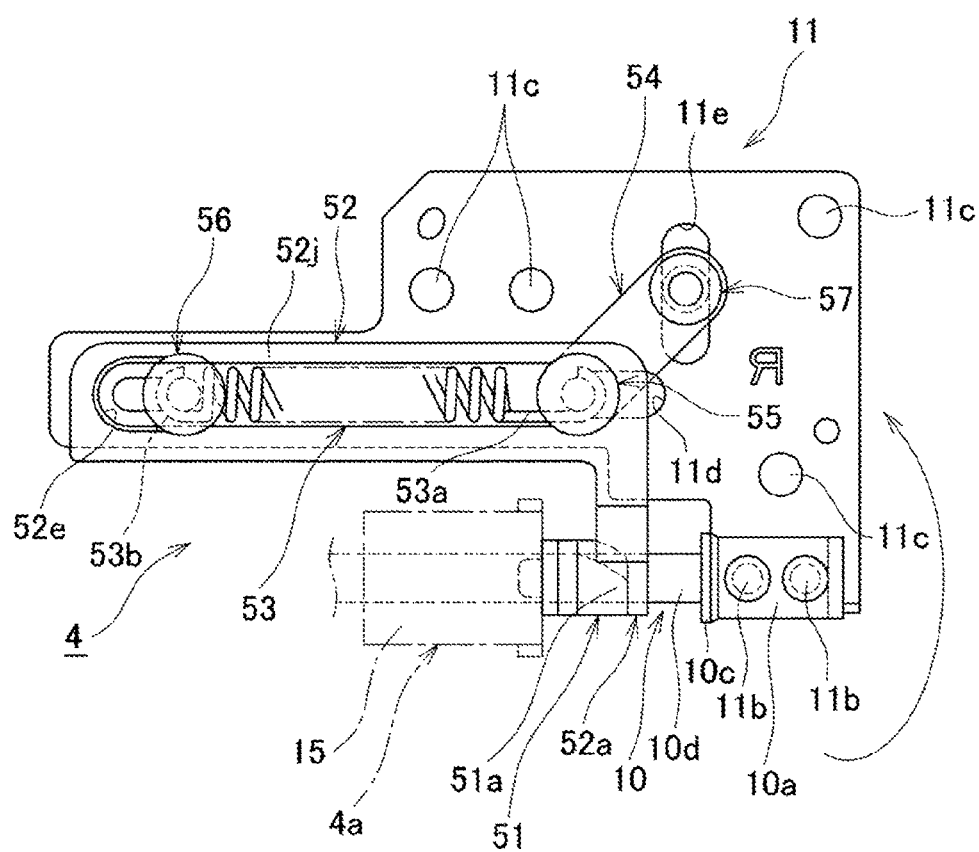
FIG. 22 is an explanatory view, when a state of FIG. 21 is seen from the plane.

In the following, reference is made to a structure of the means for sinking 40 of a keyboard portion 2a being an example of operation means. As shown in FIGS. 19 and 21, the means for sinking 40 comprises a base plate 42 provided in a keyboard portion housing portion 41 provided on the first casing 2, the keyboard portion holding plate 46 provided for holding the keyboard portion 2a on the base plate 42 at a predetermined interval from the latter, the cam mechanism 43 provided between the base plate 42 and the keyboard portion holding plate 46, and the elastic member 47 for pressing the keyboard portion 2a into the keyboard portion housing portion 41. The cam mechanism 43 comprises the linkage member 58 coupled to the link member 54, the slide member 44 coupled to the linkage member and slidably provided on the base plate 42, and the plurality of cam members 45, 45 . . . provided for holding the keyboard portion holding plate 46 on the slide member 44 at a predetermined interval from the latter; each of the cam members 45, 45 . . . comprises an inclined portion 45a, 45a . . . , which further comprises on its upper end a keyboard placing portion 45b, 45b . . . for placing and holding a flat keyboard portion holding plate 46. Each of the keyboard placing portions 45b, 45b . . . further comprises a locking groove portion 45c, 45c . . . ; therefore, the keyboard placing portions are designed such that they are engaged with or disengaged from the respective oblong hole portions 46a, 46a . . . provided on the keyboard portion holding plate 46, depending on their respective slide positions. In the meantime, the cam mechanism 43 is merely an example, and not limited to what is described in this embodiment. This embodiment can be also implemented by a linking mechanism. Moreover, the slide member 44 can be also constructed such that it is directly coupled to the link member 54, without intervention of a linkage member 58.

In the following, reference is made to the actuating mechanism 50 working on a means for sinking 40. In the embodiment, the actuating mechanism 50 comprises: the fixed cam member 51 having the fixed cam portion 51a fixed on the gear supporting member 15; the slide cam member 52 having the slide cam portion 52a facing the fixed cam portion 51a, wherein the slide cam member is engaged with the first attaching plate 11 and attached so as to be slidable in one direction in an axial direction of the first hinge shaft 10; and an elastic member 53 provided between the slide cam member 52 and the first attaching plate 11 for urging the slide cam member to slide in one direction; and the link member 54 provided between the slide cam member 52 and the first attaching plate 11 for converting the slide movement of the slide cam member in an axial direction of the first hinge shaft 10 into the movement perpendicular to the axial direction and transferring the thus converted slide movement to the means for sinking 40.

In other words, the fixed cam member 51 allows the circular shaft portion 10d of the first hinge shaft 10 to pass through an insertion hole 51b provided on an axial center in an axial direction of the fixed cam portion 51a provided on one end portion of the fixed cam member, such that the first hinge shaft can rotate; on the other hand, the fixed cam member allows its locking projection 51c provided on other end portion to engage with the locking hole 15g provided on the central part of the gear supporting member 15. The slide cam member 52 comprises an embracing portion 52b finished so as to have a U-shaped cross section and a slide cam portion 52a provided on one end portion of the embracing portion 52b, wherein the first attaching plate 11 is sandwiched between a top-side embracing piece 52c and a bottom-side embracing piece 52d, as well as the circular shaft portion 10d of the first hinge shaft 10 passes through an insertion hole 52e provided on an axial center of the slide cam portion 52a in its axial direction. On the other hand, the fixed cam portion 51a faces and abuts against the slide cam portion 52a of the slide cam member 52.

An attaching hole 52f is provided on one end portion of a top-side embracing piece 52c, and the attaching hole 52f has an axial center common with an attaching hole 52g provided on a bottom-side embracing piece 52d. A small-diameter guide oblong hole 52h is provided on the top-side embracing piece 52c, a wider guide groove 52i is provided outside the guide oblong hole 52h. A housing oblong hole 52j extending from one to other side is provided on a bottom-side embracing piece 52d, and a small-diameter guide oblong hole 52k is shaped, starting from one terminal end of the housing oblong hole 52j. In the meantime, reference numerals 52l and 52m in particular in FIG. 17B denote guide grooves for a flange portion 55a of a first guide pin 55 and a flange portion 56a of a first guide pin 56.

An elastic member 53 consisting of compression coil spring is housed in the housing oblong hole 52j, wherein its one end portion 53a passes through a first guide oblong hole 11d provided in parallel to the first hinge shaft 10, and then its upper and lower end portions (as it is seen in its upright position) are locked by guide pins 55, 56. The first guide pin 55 is attached to the attaching holes 52f, 52g respectively provided on the top-side embracing piece 52c and a bottom-side embracing piece 52d. Still further, other end portion 53b of the elastic member 53 is locked by the second guide pin 56 passing through the top-side embracing piece 52c and the bottom-side embracing piece 52d. In this manner, the slide cam member 52 is urged in an axial direction of the first hinge shaft 10.

The link member 54 having a flat and oblong shape is attached to an attaching hole 54a on one end portion side of the first guide pin 55. On the other hand, a joint pin 57 passing through a second guide oblong hole 11e provided in a direction perpendicular to that of the first guide oblong hole 11d is coupled to an attaching hole 54b provided on other end portion of the link member 54. And then, one end portion of the linkage member 58 in connection with the slide member 44 of the means for sinking 40 being an operation means is coupled to the joint pin 57, so that the joint pin is slidable in a direction perpendicular to the first hinge shaft 10.

In the meantime, as per the first hinge pin 55, a reference numeral 55a denotes a flange portion, and a reference numeral 55b—a spacer ring. In the meantime, as per the second hinge pin 56, a reference numeral 56a denotes a flange portion, and a reference numeral 56b—a washer. The second hinge pin 56 passes through an insertion hole 11f provided on a first attaching plate 11 to engage with guide oblong holes 52h and 52k. In the meantime, as per the joint pin 57, a reference numeral 57a denotes a flange portion, a reference numeral 57b—a spacer ring, and a reference numeral 57c—a washer.

In the following, reference is made to the operation of the biaxial hinge 4 according to the invention. First, reference is made to the biaxial hinge portion 4a according to the invention. The biaxial hinge portion 4a allows the first casing 2 and the second casing 3, which forms the tablet notebook PC 1 being an example of the electronic device, to relatively open and close. The biaxial hinge portion is characterized in that the first hinge shaft 10 attached to the first casing 2 side via the first attaching plate 11 is coupled in parallel to the second hinge shaft 12 attached to the second casing 3 side via the second attaching plate 13, by means of the gear supporting member 15 of the means for synchronizing the rotation 14 also functioning as the first joint member, the friction plate 31 also functioning as the second joint member and the cam plate member 36 also functioning as the third joint member, such that hinge shafts are rotatable. When only one of the first casing 2 and the second casing 3 open and close relative to other, the means for synchronizing the rotation 14 simultaneously open and close the remaining casing, so that the opening and closing operation can be quickly and easily accomplished.

Namely, reference is first made to how the second casing 3 which is e.g. held by one hand of the user opens from its closed state, e.g. as shown in FIG. 1B, relative to the first casing 2 which is e.g. held by another hand of the user. Here, when the second casing 3 rotates clockwise, the first hinge shaft 10 first rotates clockwise and the first gear 17 does so in the same direction (clockwise). On the other hand, when the first gear 17 rotates clockwise, the intermediate gear 20 rotates counterclockwise via the lower bevel tooth portion 20c of the intermediate gear 20 meshed with the first bevel tooth portion 17b of the first gear 17 rotating together with first hinge shaft 10, and the second gear 18 attached to the second hinge shaft 12 (in which the second bevel tooth portion 18b of the second gear 18 meshes with the upper bevel tooth portion 20d of the intermediate gear 20) rotates counterclockwise as well. In this manner, the first hinge shaft 10 rotates in a direction opposite to the rotation direction of the second hinge shaft 12, and therefore the first casing 2 rotates at the same time as the second casing 3 in a direction opposite to the rotation direction of the latter, which results in the opening and closing operation of both casings. In this manner, an enhanced operability is assured.

Next, reference is made to sucking operation by the means for sucking 35: when the first casing 2 and the second casing 3 are opened relative to each other to form an opening angle of 360 degrees, the means for sucking takes effect slightly before this opening angle, so that the first casing 2 and the second casing 3 are automatically opened relative to each other, in order to maintain this fully opened state. A similar movement of the first means for sucking 35a and the second means for sucking 35b also takes place when the first casing 2 and the second casing 3 move together, in order to form a closing angle of 0 degree. Still further, the means for sucking 35 can thus maintain the position of the first casing 2 and the second casing 3 at their closed state and the fully opened state, without allowing the first casing 2 and the second casing 3 to automatically open and close relative to each other, even without latching mechanism between the first casing 2 and the second casing 3.

Still further, the first casing 2 and the second casing 3 synchronously open relative to each other, respectively rotating toward opposite directions, via the means for synchronizing the rotation 14, so that the first casing is opened 360 degrees in total relative to the second casing. In this state, the first casing 2 overlaps the second casing 3, wherein the respective surfaces now facing each other are opposite to the ones facing each other in the closed state.

When the first casing 2 and the second casing 3 open and close relative to each other as described above, the first means for generating friction torque 30a and the second means for generating friction torque 30b of the means for generating friction torque 30 function concurrently with each other, when the first hinge shaft 10 and the second hinge shaft 12 rotate relative to each other. Still further, the first means for generating friction torque 30a generates a friction torque between both sides of the lower part of the friction plate 31 and one side of the lower part of the cam plate member 36 also functioning as third joint member, together with the first A friction washer 32A and the first B friction washer 32B. Thus, the first means for generating friction torque 30a can accomplish a stable stopping function of the first casing 2 and the second casing 3 at any angle during their opening and closing operation.

On the other hand, the second means for generating friction torque 30b generates a friction torque between both sides of the upper part of the friction plate 31 and one side of the upper part of the cam plate member 36 also functioning as third joint member, together with the second A friction washer 33A and the second B friction washer 33B. Thus, the second means for generating friction torque 30b can accomplish a stable stopping function of the first casing 2 and the second casing 3 at any angle during their opening and closing operation.

Still further, as per the means for sucking 35, the first means for sucking 35a and the second means for sucking 35b start functioning slightly before the opening and closing angle of 0 and 180 degrees, so that the first A cam convex portion 37b (and the first B cam convex portion 37c, respectively) of the first cam follower 37 falls onto the first A cam concave portion 36c (and the first B cam concave portion 36d, respectively) of the cam plate member 36 also functioning as third joint member, while the second A cam convex portion 38b (and the second B cam convex portion 38c, respectively) of the second cam follower 38 falls onto the second A cam concave portion 36e (and the second B cam concave portion 36f, respectively) of the cam plate member 36 also functioning as third joint member. In this manner, the means for sucking 35 assumes the sucking function, in order to rotatably urge the first casing 2 and the second casing 3 in the opening direction and the closing direction in an automatic manner.

Further, the biaxial hinge 4 according to the invention assures, in addition to the original application of the notebook PC 1, a variety of additional applications, such as by synchronously rotating the first casing 2 and the second casing 3 relative to each other via the biaxial hinge 4 in opposite directions and folding into the shape substantially of the letter L and into the angle shape, as well as by allowing the both casings to overlap each other to form a flat tablet and turning the second casing 3 to the operator, such that the notebook PC has a function as a tablet PC.

In the following, based on the drawings, reference is made to the operation of the means for sinking 40 (an example of operation means) of the keyboard portion 2a, as well as that of the actuating mechanism 50 for actuating the means for sinking 40, when the first casing and the second casing open relative to each other respectively 180 degrees from the closed state, in order to form 360 degrees in total.

Figure 20:
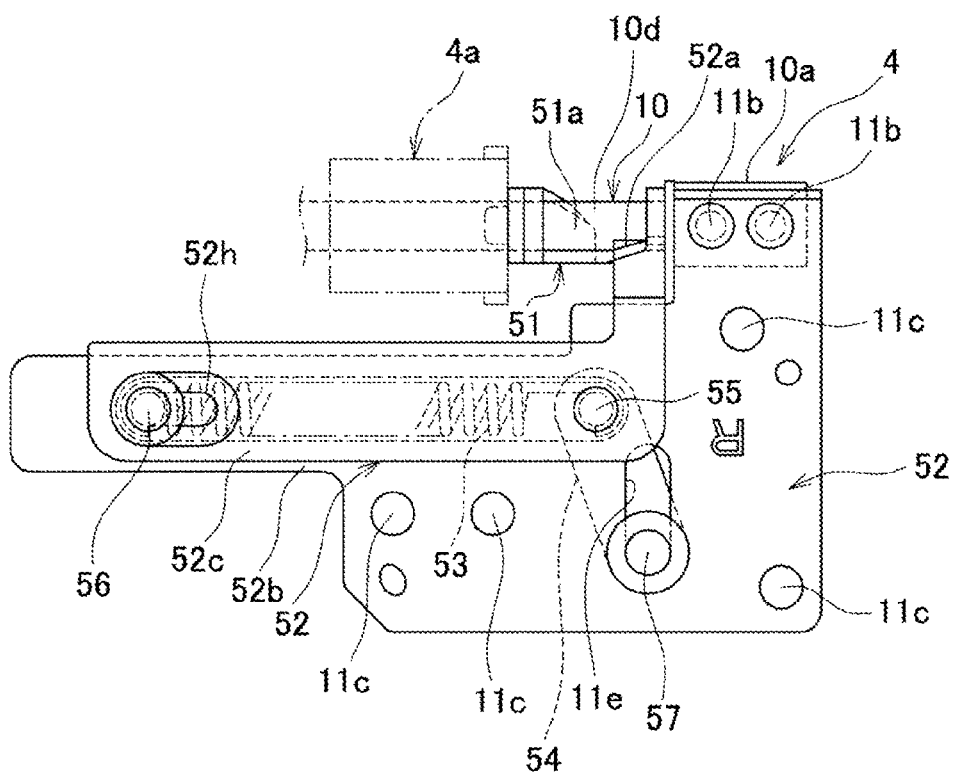
FIG. 20 is an explanatory view, when a state of FIG. 19 is seen from the plane.

As shown in FIGS. 19 and 20, when the first casing 2 and the second casing 3 are closed to form an opening and closing angle of 0 degree, the hinge case 7 is placed in an upright position, and the actuating member 52 of the actuating mechanism 50 is pressed by the a fixed cam portion 51c of the fixed cam member 51, in order to reach to right in the drawing, against the resilient force of the elastic member 53. The slide member 44 connected with a linkage member 58 of the link member 54 and means for sinking 40 keeps the position of the upper part of the keyboard portion 2a, in which the upper part protruding from the upper surface of the first casing 2 through cam members 45, 45 of the cam mechanism 43. This state is shown in FIG. 19.

When the second casing 3 opens relative to the first casing 2 clockwise—or the same applies to the case that the first casing 2 opens relative to the second casing 3 counterclockwise—from the closed state, the first hinge shaft 10 rotates counterclockwise together with the first attaching plate 11 attached to the first casing 2 via the means for synchronizing the rotation 14. Then, due to the resilient force of the elastic member 53, the slide cam portion 52a of the slide cam member 52 abutting against the fixed cam portion 51a of the fixed cam member 51 moves to the left in an axial direction of the first hinge shaft 10, so that the slide cam member 52 slides together with the first hinge pin 55, in a direction identical to the slide direction of the latter. Thus, the link member 54 coupled to the first hinge pin 55 is guided by the second guide oblong hole 11e to slide in a direction perpendicular to the slide direction of the first hinge shaft 10, so that the linkage member 58 of the means for sinking 40 (an example of an operation means) coupled to the link member 54 slides to cause the keyboard portion 2a to sink into the first casing 2, via the cam members 45, 45 . . . of the keyboard portion holding plate 46. FIG. 21 shows a state in which each of the first casing 2 and the second casing 3 has rotated 180 degrees, so that both have made a stroke of 360 degrees in total, to overlap with surfaces different from those overlapping at 0 degree. Therefore, even when the tablet PC lies on the table, with the surface including the keyboard portion 2a facing the table surface, the above described arrangement can prevent a direct contact of various keys on the keyboard portion 2a with the table surface, and thus erroneous operations of various keys on the keyboard portion 2a.

When the first casing 2 opened relative to the second casing 3 rotates to restore the original closed state—or the same applies to the case that the second casing 3 rotates relative to the first casing 2 to restore the original closed state —, the slide cam member 52 slides in a direction contrary to the above-mentioned movement, i.e. to the right, together with the first attaching plate 11 rotating clockwise, against the resilient force of the elastic member 53. In this manner, the slide member 44 of the means for sinking 40 slides toward the biaxial hinge portion 4a by the link member 54 via the linkage member 58, so that the keyboard portion 2a returns to the original projecting state from the sinking state via cam members 45, 45 . . . .

In the meantime, other embodiments of the biaxial hinge portion 4a include, though not shown in the drawings, the use of spur gears for the first gear 17 and the second gear 18, whereby the gears can be so designed that they directly mesh with each other, without intervention of an intermediate gear. Still further, an elastic member 53 can be replaced with compression coil springs or the ones made of elastic materials, i.e. synthetic resin such as rubber. Still further, even without the hinge cases 7, 8, the function of the biaxial hinges 4, 6 is not particularly impaired, but the use of the hinge cases 7, 8 has an advantage that the biaxial hinges 4, 6 as attached to the notebook PC 1 have a neat appearance, since the hinge cases prevent the means for synchronizing the rotation 14, the means for selectively restricting rotation by known techniques, the means for generating friction torque 30, the means for sucking 35, known rotating means, and others from an exposure to the outside.

Still further, the actuating mechanism 50 according to the invention can actuate not only the means for sinking 40 of the keyboard portion 2a, but also the means for sinking rubber feet provided on the first casing 2 or other operation means, as explained above.

The present invention is constructed as described above, so that it is suitable for use in an electronic device using the biaxial hinge such as a notebook PC and the like, wherein a first casing and a second casing synchronously open relative to each other, and both casings open and close relative to each other in a total range of 360 degrees. The present invention is particularly suitable for use in a tablet PC, among various notebook PCs.

What is claimed is:

1. A biaxial hinge of an electronic device, such as tablet notebook PC, which couples a first casing on a keyboard side and a second casing on a display side, thereby these casings being openable and closable 360 degrees relative to each other,
    said biaxial hinge comprising a biaxial hinge portion and an actuating mechanism for actuating an operation means working on a keyboard portion, rubber feet and others provided on said first casing or said second casing;
    said biaxial hinge portion comprising:
    a means for controlling the rotation, said means making a first hinge shaft attached to said first casing via a first attaching plate and a second hinge shaft attached to said second casing via the second attaching plate rotatable in parallel via a plurality of joint members, as well as controlling the rotation of the first hinge shaft and the second hinge shaft;
    said actuating mechanism comprising:
    a fixed cam member, said first hinge shaft passing through said fixed cam member in a rotatable manner;
    a slide cam member attached facing said fixed cam member, thereby said slide cam member being slidable in one direction in an axial direction of said first hinge shaft; and
    a link member provided between said slide cam member and said attaching plate for converting a slide movement of said slide cam member in an axial direction of said first hinge shaft into a movement perpendicular to said axial direction and transferring the converted movement to said operation means.

2. The biaxial hinge according to claim 1,
    said means for controlling the rotation comprising:
    a means for synchronizing the rotation, said means causing one of said first hinge shaft and said second hinge shaft to synchronously rotate in a direction different from a rotation of other hinge shaft;
    a means for generating friction torque respectively provided on said first hinge shaft and said second hinge shaft; and
    a means for sucking respectively provided on said first hinge shaft and said second hinge shaft.

3. The biaxial hinge according to claim 1,
    said means for controlling the rotation comprising:
    a means for selectively restricting the rotation, said means restricting the rotation of one hinge shaft during the rotation of other hinge shaft, thereby both hinge shafts rotating one after the other;
    said means for generating friction torque respectively provided on said first hinge shaft and said second hinge shaft; and a means for sucking respectively provided on said first hinge shaft and said second hinge shaft.

4. The biaxial hinge according to claim 1, said operation means being a means for sinking of said keyboard portion, said means for sinking consisting of a cam mechanism for moving upwards and downwards a keyboard portion holding plate in association with said slide movement of said actuating member of said actuating mechanism, and said keyboard portion being provided on an upper part of said keyboard portion holding plate.

5. The biaxial hinge according to claim 1,
    the actuating mechanism comprising: said fixed cam member rotating together with the first hinge shaft; said slide cam member attached facing the fixed cam member so as to be slidable in one direction in an axial direction of the first hinge shaft; and an elastic member provided between said slide cam member and said first attaching plate for urging a slide movement of the slide cam member in one direction; and a link member for converting the slide movement of the slide cam member in an axial direction of the first hinge shaft into the movement perpendicular to the axial direction and transferring the converted movement to said operation means.

6. The biaxial hinge according to claim 2, said means for synchronizing the rotation comprising: a gear supporting member also functioning as first joint member for pivotally supporting said first hinge shaft and said second hinge shaft toward the identical direction; an intermediate gear having a lower bevel tooth portion on a lower part and an upper bevel tooth portion on an upper part, said intermediate gear being pivotally supported between a lower projecting portion and an upper projecting portion of said gear supporting member in a rotatable manner; a first gear meshed with said lower bevel tooth portion, the rotation of said first gear being restricted by said first hinge shaft, thereby said first gear being attached to said first hinge shaft; and a second gear meshed with said upper bevel tooth portion, the rotation of said second gear being restricted by said first hinge shaft, thereby said second gear being attached to said first hinge shaft.

7. The biaxial hinge according to claim 2, said means for generating friction torque consisting of a first means for generating friction torque and a second means for generating friction torque, said first means for generating friction torque comprising: a friction plate also functioning as second joint member; a first A friction washer and a first B friction washer provided on both sides of the lower part of said friction plate, between said first gear of said means for synchronizing the rotation and said cam plate member of said means for sucking of said biaxial hinge portion, thereby said first A friction washer and said first B friction washer being rotatable together with said first hinge shaft; and a first elastic means provided on said first hinge shaft for bringing said first A friction washer and said first B friction washer into press contact with said friction plate and said cam plate member;

said second means for generating friction torque comprising: a friction plate also functioning as second joint member; a second A friction washer and a second B friction washer provided on both sides of the upper part of said friction plate, between said second gear of said means for synchronizing the rotation and said cam plate member of said means for sucking of said biaxial hinge portion, thereby said first A friction washer and said first B friction washer being rotatable together with said second hinge shaft; and a second elastic means provided on said second hinge shaft for bringing said second A friction washer and said second B friction washer into press contact with said friction plate and said cam plate member.

8. The biaxial hinge according to claim 2, said means for sucking consisting of a first means for sucking and a second means for sucking, said first means for sucking comprising: a first A cam concave portion and a first B cam concave portion, each having substantially a circular arc shape and provided outside on one side toward a third A bearing hole of said cam plate member for bearing said first hinge shaft, said first hinge shaft and said second hinge shaft passing through said cam plate member, said first hinge shaft and said second hinge shaft being rotatable; a first cam follower attached to said first hinge shaft, the rotation of said first cam follower being restricted by said first hinge shaft, said first cam follower comprising a first A cam convex portion and a first B cam convex portion on a side facing said first A cam concave portion and said first B cam concave portion; and a first elastic means for bringing said first A cam concave portion into press contact with said first A cam convex portion, as well as said first B cam concave portion with said first B cam convex portion;

said second means for sucking comprising: a second A cam concave portion and a second B cam concave portion, each having substantially a circular arc shape and provided outside on one side of a third B bearing hole of said cam plate member for bearing said second hinge shaft, said first hinge shaft and said second hinge shaft passing through said cam plate member, said first hinge shaft and said second hinge shaft being rotatable; a second cam follower attached to said second hinge shaft, the rotation of said second cam follower being restricted by said second hinge shaft, said second cam follower comprising a second A cam convex portion and a second B cam convex portion on a side facing said second A cam concave portion and said second B cam concave portion; and a second elastic means for bringing said second A cam concave portion into press contact with said second A cam convex portion, as well as said second B cam concave portion with said second B cam convex portion.

9. An electronic device using the biaxial hinge according to claim 1.

10. An electronic device using the biaxial hinge according to claim 2.

11. A electronic device using the biaxial hinge according to claim 3.

12. An electronic device using the biaxial hinge according to claim 4.

13. An electronic device using the biaxial hinge according to claim 5.

14. An electronic device using the biaxial hinge according to claim 6.

15. An electronic device using the biaxial hinge according to claim 7.

16. An electronic device using the biaxial hinge according to claim 8.

* * * * *